United States Patent
Tanaka et al.

(10) Patent No.: US 11,753,823 B2
(45) Date of Patent: Sep. 12, 2023

(54) SHORT FIBER-REINFORCED CONCRETE STRUCTURE USING CONTINUOUS FIBER-REINFORCED POLYMER MATERIAL

(71) Applicants: TOKYO ROPE MGF. CO., LTD., Tokyo (JP); ORIENTAL SHIRAISHI CORPORATION, Tokyo (JP)

(72) Inventors: Yoshihiro Tanaka, Tokyo (JP); Eiji Koda, Tokyo (JP); Toru Tanaka, Tokyo (JP); Meguru Tsunomoto, Tokyo (JP); Hiroshi Watase, Tokyo (JP); Tomohiro Ishii, Tokyo (JP)

(73) Assignees: TOKYO ROPE MFG. CO., LTD., Tokyo (JP); ORIENTAL SHIRAISHI CORPORATION, Tokyo (JP)

( * ) Notice: Subject to any disclaimer, the term of this patent is extended or adjusted under 35 U.S.C. 154(b) by 10 days.

(21) Appl. No.: 17/601,922

(22) PCT Filed: Jan. 31, 2020

(86) PCT No.: PCT/JP2020/003707
§ 371 (c)(1),
(2) Date: Oct. 6, 2021

(87) PCT Pub. No.: WO2020/208910
PCT Pub. Date: Oct. 15, 2020

(65) Prior Publication Data
US 2022/0145626 A1    May 12, 2022

(30) Foreign Application Priority Data

Apr. 8, 2019  (JP) ................................. 2019-073822
Jan. 15, 2020 (JP) ................................. 2020-004748

(51) Int. Cl.
E04C 2/06       (2006.01)
C04B 14/38      (2006.01)
(Continued)

(52) U.S. Cl.
CPC .............. *E04C 2/06* (2013.01); *C04B 14/386* (2013.01); *C04B 16/0633* (2013.01); *E04B 5/04* (2013.01);
(Continued)

(58) Field of Classification Search
CPC ..... E04B 5/04; E04B 5/43; E04C 2/06; E04C 5/073; E04C 5/20; C04B 14/386; C04B 16/0633
See application file for complete search history.

(56) References Cited

U.S. PATENT DOCUMENTS 5,993,537 A  * 11/1999  Trottier ................... C04B 28/04
                                                         106/819
10,239,789 B2 * 3/2019  Sorger ................ C04B 24/2623
(Continued)

FOREIGN PATENT DOCUMENTS

CN        1273951 A   * 11/2000   ......... C04B 16/0633
CN      106836622 B   *  1/2020   ............ C04B 28/00
(Continued)

OTHER PUBLICATIONS

International Search Report (ISR) (and English translation thereof) dated Mar. 10, 2020 issued in International Application No. PCT/JP2020/003707.
Written Opinion dated Mar. 10, 2020 issued in International Application No. PCT/JP2020/003707.

*Primary Examiner* — Jessie T Fonseca
(74) *Attorney, Agent, or Firm* — Holtz, Holtz & Volek PC

(57) ABSTRACT

A concrete structure includes a continuous fiber-reinforced polymer material arranged as a main reinforcing material or a tendon. A short fiber reinforcing material consisting of an organic fiber is mixed in 0.5% or more with respect to an entire volume. The continuous fiber-reinforced polymer material is shaped like a rod or a stranded wire. A ratio Lf/Gm between a fiber length Lf of the organic fiber of the
(Continued)

short fiber reinforcing material and a maximum aggregate diameter Gm of a concrete composition is 1.2 to 3.7, and an aspect ratio Lf/De, in which De is an equivalent diameter that is a cross-sectional area of the organic fiber converted into a circle diameter, is 30 to 69.

10 Claims, 9 Drawing Sheets

(51) Int. Cl.
  *C04B 16/06* (2006.01)
  *E04C 5/07* (2006.01)
  *E04B 5/04* (2006.01)
  *E04B 5/43* (2006.01)
  *E04C 5/20* (2006.01)
(52) U.S. Cl.
  CPC ............... *E04B 5/43* (2013.01); *E04C 5/073* (2013.01); *E04C 5/20* (2013.01)

(56) References Cited

U.S. PATENT DOCUMENTS

| | | | |
|---|---|---|---|
| 10,947,156 B2* | 3/2021 | Banthia | C04B 16/0633 |
| 11,174,637 B2* | 11/2021 | Ahagon | C04B 14/386 |
| 2009/0169885 A1* | 7/2009 | Carter | E04C 5/073 |
| | | | 264/145 |
| 2010/0043673 A1 | 2/2010 | Batoz et al. | |
| 2017/0198478 A1 | 7/2017 | Ahagon et al. | |

FOREIGN PATENT DOCUMENTS

| | | |
|---|---|---|
| JP | H0664954 A | 3/1994 |
| JP | H06183809 A | 7/1994 |
| JP | 2002154855 A | 5/2002 |
| JP | 2006232562 A | 9/2006 |
| JP | 2014139135 A | 7/2014 |
| JP | 2016204925 A | 12/2016 |
| WO | 2016024438 A1 | 2/2016 |

* cited by examiner

SHORT FIBER-REINFORCED CONCRETE STRUCTURE USING CONTINUOUS FIBER-REINFORCED POLYMER MATERIAL

TECHNICAL FIELD

The present invention relates to a concrete structure reinforced with a continuous fiber-reinforced polymer material and a short fiber reinforcing material. More particularly, the present invention relates to a concrete slab reinforced with a continuous fiber-reinforced polymer material and a short fiber reinforcing material.

BACKGROUND ART

Conventionally, reinforcing bars have most often been used as a main reinforcing material to primarily bear the tensile force and provide reinforcement, in order to compensate for the shortcoming of concrete being weak against tensile force. Also, for so-called "reinforced concrete structures", an engineering academic system for them has been established. However, in recent years, there has been much debate about the durability of reinforced concrete structures, mostly concerning corrosion due to the rusting of reinforcing bars in concrete. Corrosion of reinforcing bars causes damage earlier than the expected lifetime such as peeling of concrete cover, accelerated deterioration of concrete due to increase in crack width, decrease in structural capacity due to reduction in the cross-sectional area of reinforcing bars, and so forth. Consequently, the fact that maintenance and repair require a great deal of money and labor has been taken up as a recent social problem.

As countermeasures for the corrosion of reinforcing bars, measures such as (1) switching from conventional reinforcing bars to epoxy-coated reinforcing bars, and (2) securing a larger concrete cover for reinforcing bars than heretofore have been taken, and design standards, construction methods and so forth corresponding to these have been adopted.

However, in recent years, it has become clear that epoxy reinforcing bars have a risk that the surface of epoxy coating gets scratched by a slight impact caused when, for example, hitting something, and corrosion spreads from there more than with conventional reinforcing bars. For example, in the states of Florida and Virginia in the United States, concrete structures using epoxy reinforcing bars have suffered significant damage from corrosion of epoxy reinforcing bars. As a result of this, the use of epoxy reinforcing bars has been banned in these states.

On the other hand, the policy of using conventional reinforcing bars and making the concrete cover larger than heretofore is standardized in the Specification for Highway Bridges in Japan. For example, in an area with a severe chloride-induced corrosion environment, the cover of concrete needs to be at least 70 mm or more. Consequently, in some areas where concrete structures are built, the thickness of concrete cover will increase significantly, compared to conventional cases. However, if this is applied to the superstructure of bridges, the concrete structure's dead weight will increase and place heavier burden on the substructure, leading to problems such as increased cost of construction for, for example, seismic retrofitting for the substructure.

Also, conventionally, PC steel stranded wires (referring to PC steel strands, and the same will hold hereinafter) have been widely used as tendons for pre-stressed concrete structures. As an anti-rust measure for such PC steel stranded wires, anti-rust PC steel stranded wires that coat PC steel stranded wires with resin-based materials have recently started to be used, but they have been introduced into service only a short time ago, and have not proven their reliability yet. Also, when employing anti-rust PC steel stranded wires, it is necessary to use, for example, anchoring devices with anti-rust characteristics, and their maintenance cost remain as a problem. In addition, reinforcing bars such as sub. rebars are required for pre-stressed concrete structures, and it is necessary to employ epoxy reinforcing bars for the sub. rebars, and therefore the above-described problem with epoxy reinforcing bars remains as it is.

As a countermeasure against the corrosion and deterioration of concrete structures such as the reinforced concrete structures and pre-stressed concrete structures described above, continuous fiber-reinforced polymer materials that, having non-metallic characteristics, do not rust in any chloride environment have been proposed for use as main reinforcing materials or tendons. Also, employing continuous fiber-reinforced polymer materials as main reinforcing materials or tendons have already been in service for concrete structures such as bridge superstructures and loading/unloading pier slabs in ports.

These continuous fiber-reinforced polymer materials are materials having excellent characteristics such as ultra-durable tensile strength characteristics equal to or higher than that of PC steel stranded wires and light weight, in addition to rust-free characteristics. However, at present, when continuous fiber-reinforced polymer materials are used as main reinforcing materials for concrete slabs (equivalent to main tensile reinforcing bars for reinforced concrete structures), or as tendons for pre-stressed concrete slabs, there are mainly the following three problems.

Note that continuous fiber-reinforced polymer materials refer to FRP (Fiber-Reinforced Plastic) reinforcing materials, which are composite materials to bundle and impregnate continuous fibers such as carbon fibers, aramid fibers and glass fibers with a resin such as epoxy resin, vinyl ester resin, methacrylic resin, polycarbonate resin, and vinyl chloride.

(1) The Problem that a Continuous Fiber-Reinforced Polymer Material has Lower Shear Rigidity than Reinforcing Bars and PC Steel Stranded Wires Since a continuous fiber-reinforced polymer material has very low shear rigidity and shear capacity, there is a problem that the dowel effect, which greatly contributes to shear capacity, cannot be expected when a continuous fiber-reinforced polymer material is used as a main reinforcing material. It then follows that, when this is applied to a concrete slab, the shear capacity is reduced significantly, and needs to be reinforced using shear reinforcing bars. On the other hand, when reinforcing bars or PC steel stranded wires are used in a concrete slab, the shear rigidity and the shear capacity are secured, so that the dowel effect works effectively, and there is no need for reinforcement by shear reinforcing bars.

For example, when reinforcing bars are used as main tensile reinforcing bars in a concrete slab, the main reinforcing bar imparts the tensile force with respect to the bending moment, so that the concrete slab can resist the bending moment. Also, on the concrete slab, the cross-sectional force caused by the shear force acts, in addition to the bending moment caused by the wheel load of the vehicles that travel on the concrete slab.

The concrete slab has a slab structure, in which the thickness is approximately 20 cm to 35 cm and the span length between main girders is approximately 2.5 m to 3.5 m. Consequently, for the cross-sectional shear force caused by the wheel load and the concrete slab's dead weight, generally, it is possible, in most cases, to manage providing enough shear capacity as required, by means of the shear resistance of concrete and the dowel effect of the main tensile reinforcing bar, without arranging shear reinforcing bars.

Here, the dowel effect of reinforcing bars refers to the mechanism, in which, when the main reinforcing bar receives shear force in the direction perpendicular to the reinforcing bars' axis, the shear rigidity and shear capacity of the reinforcing bars resist the shear force. That is, with a reinforced concrete slab having a normal configuration with reinforcing bars, usually, when a cross-sectional force such as a wheel load-induced static bending moment or a static shear force applies, the reinforced concrete slab undergoes bending failure, not shear failure.

Meanwhile, continuous fiber-reinforced polymer materials can anticipate little shear rigidity. It then follows that, when a continuous fiber-reinforced polymer material is arranged as the main tensile material of a concrete slab to replace the above-described main tensile reinforcing bars, the concrete alone has to bear the shear force. In this case, the concrete slab might undergo shear failure, without bending failure. When concrete slabs undergo shear failure, this failure mode cannot be tolerated from the perspective of design. Consequently, it is necessary to take measures such as arranging shear reinforcing bars that use a continuous fiber-reinforced polymer material.

Next, a case will be considered below in which a continuous fiber-reinforced polymer material used as a tendon in a concrete slab. In this case, the comparison between a concrete slab to use a conventional PC steel stranded wire as a tendon and a concrete slab to use a tendon of a continuous fiber-reinforced polymer material should be considered. When the pre-stressing is introduced to a concrete slab, the compressive stress acts on the concrete slab, and the diagonal cracking angle produced in the concrete slab due to shear force becomes moderate, so that the shear resistance increases, and the shear capacity improves in both concrete slabs. However, when a continuous fiber-reinforced polymer material is used as a tendon, the dowel effect cannot be expected, so that the shear capacity is inevitably lowered compared to the PC steel stranded wire.

(2) The Problem that a Continuous Fiber-Reinforced Polymer Material has a Smaller Elastic Modulus than Reinforcing Bars A continuous fiber-reinforced polymer material has a lower tensile elastic modulus than conventional reinforcing bars and PC steel stranded wires. Consequently, there is a problem that the resistance performance against bending cracks due to the bending moment decreases, the bending crack width increases, and the amount of deflection due to bending deformation grows bigger.

That is, the problem is that the elastic modulus $E_f$ of a continuous fiber-reinforced polymer material decreases approximately 25 to 30%, compared to the elastic modulus $E_s$ of reinforcing bars. For example, an example will be considered below, in which a continuous fiber-reinforced polymer material is used as a main reinforcing material for a concrete slab (as an alternative to the main tensile reinforcing bar). In the cross section on the tension side located below the neutral axis, with respect to the cross-sectional force due to the positive bending moment, the tensile rigidity (=EA) of the tensile reinforcing material (main reinforcing material) (here, E=the elastic modulus of the tensile material, and A=the cross-sectional area of the tensile reinforcing material) is involved in the tensile strain on the tension side. If the cross-sectional area $A_s$ of the reinforcing bar and the cross-sectional area $A_f$ of the continuous fiber-reinforced polymer material are the same, the tensile rigidity (=EA) of the tensile reinforcing material becomes smaller in the continuous fiber-reinforced polymer material, with respect to the cross-sectional force due to the bending moment.

In short, a concrete slab, in which a continuous fiber-reinforced polymer material, having the same cross-sectional area as a reinforcing bar, is arranged, has a larger tensile strain on the tensile side for the same bending moment, and, as a result of this, the bending crack width of concrete grows bigger for the same bending moment. A large crack width reduces the resistance to freezing and thawing of concrete (water that enters the crack width freezes and expands, causing deterioration of concrete), and, furthermore, the structural deterioration due to repeated fatigue caused by the wheel load is more likely to increase, leading to increased risk of long-term deterioration of the concrete slab.

Here, given that the continuous fiber-reinforced polymer material is a material that does not rust like a reinforcing bar and its durability remains unaffected even if the crack width grows bigger, leading to the idea that the design may not have to take the crack width into account. However, given the same bending moment, the concrete slab of a continuous fiber-reinforced polymer material shifts the neutral axis upward earlier than reinforcing bars, and so the concrete strain on the compression side grows bigger. As a result of this, when concrete having a low compressive strength is used, the bending capacity may be lower than that of reinforced concrete slabs.

Given the above problem, when trying to have the same bending crack width, it may be possible to make the cross-sectional area $A_f$ of a continuous fiber-reinforced polymer material 1.30 to 1.46 times the cross-sectional area $A_s$ of a reinforcing bar. However, the price of continuous fiber-reinforced polymer materials is very expensive compared to reinforcing bars, which is economically disadvantageous. Also, since the guaranteed tensile ultimate strength of a continuous fiber-reinforced polymer material reaches approximately 6 times the breaking strength of a reinforcing bar, it is not possible to use until the ultra-high tensile stress zone the continuous fiber-reinforced polymer material has, and the ultimate bending moment is determined by the compression failure of concrete. In other words, it is an economically and structurally disadvantageous material because the characteristics of the high-strength characteristics the continuous fiber-reinforced polymer material has cannot be utilized.

Also, the fact that the tensile rigidity is low and the crack width grows bigger as a result means that the bending deflection due to the bending moment under the same load becomes larger. Consequently, for example, concrete slabs for railway bridges that require limits on deflection will lose their structural functions.

As described earlier, in the event a continuous fiber-reinforced polymer material is used, there is an idea that the bending crack width may be larger than that of conventional reinforced concrete (RC structure), because there is no worry of corrosion. However, considering the aesthetics of the concrete surface, deterioration of performance against freezing and thawing, and increased risk of peeling of concrete cover, it is necessary to make the maximum crack width 0.5 mm to 0.8 mm in the use limit state, and, consequently, it is necessary to apply strain control to the continuous fiber-reinforced polymer material in the use limit state. As a result of this, the continuous fiber-reinforced polymer material is economically disadvantageous.

Here, if it is required to have a crack width equivalent to that of RC, it is necessary to increase the cross-sectional area of the continuous fiber-reinforced polymer material fiber by 30 to 46% of the cross-sectional area of the reinforcing bar. However, since the concrete cover can be made smaller than the reinforcing bar, it is possible to reduce increase in the cross-sectional area of the continuous fiber-reinforced polymer material somewhat. However, ranking up the diameter of a continuous fiber-reinforced polymer material, which is fundamentally expensive, is a problem from an economic perspective.

(3) The Problem that a Continuous Fiber-Reinforced Polymer Material has High Tensile Strength Compared to Reinforcing Bars and PC Steel Stranded Wires, and has No Yield Point Although a continuous fiber-reinforced polymer material has ultra-high tensile strength, there is no yield point, and its expandability is limited, and therefore there is a problem that the bending toughness performance due to the bending moment decreases.

For example, the guaranteed tensile ultimate strength of a continuous carbon-fiber-reinforced polymer material is approximately 5.5 to 6.0 times that of the reinforcing bar SD345. Consequently, when using the continuously fiber-reinforced polymer material as a substitute for the reinforcing bar, it is likely to consider only the ratio of the tensile strength and assume that the cross-sectional area can be reduced to ⅕ to ⅙. However, as mentioned earlier, since the elastic modulus of a continuous fiber-reinforced polymer material is small, even if a continuous fiber-reinforced polymer material having the same cross-sectional area is arranged, the bending capacity of the concrete slab against the bending moment is lower than when reinforcing bars are arranged. This is because, when the tensile strain of the continuous fiber-reinforced polymer material is compared with the compressive strain of concrete, the compressive strain of concrete often reaches the limit strain for failure first.

The reinforcing bar SD345 has a yield point, where the yield strain is 0.17% to 0.20% and the yield stress is approximately 345 N/mm$^2$, breaking when the maximum strain reaches 18 to 19% and the maximum stress reaches approximately 490 N/mm$^2$. By contrast with this, in the event a carbon-fiber-reinforced polymer material is used, which has the best performance among continuous fiber-reinforced polymer materials, there is no yield point, and the guaranteed ultimate stress is approximately 2400 N/mm$^2$, breaking when the maximum stress reaches approximately 2900 to 3000 N/mm$^2$. Also, the maximum distortion at that time is approximately 1.7%. Thus, since a continuous fiber-reinforced polymer material has no yield point, when this is used as a bending tensile reinforcing material for concrete slabs, bending toughness after the yield point cannot be expected as in reinforced concrete.

On the other hand, a PC steel stranded wire has a yield point with a yield strain of 0.2% and a yield stress of 1580 N/mm$^2$, breaking when the maximum strain reaches 1.7% and the maximum stress reaches approximately 2300 to 2400 N/mm$^2$. When a PC steel stranded wire or a continuous fiber-reinforced polymer material is used as a tendon in a concrete slab, the final bending capacity is influenced by the tensile characteristics of the tendon. Consequently, it is difficult to expect bending toughness in bending capacity even when a continuous fiber-reinforced polymer material is used as a tendon, as when reinforced concrete is used.

Also, patent literature 1 discloses fiber-reinforced concrete, in which short fibers consisting of organic fibers are mixed in fiber-reinforced concrete containing continuous fibers consisting of organic fibers, as a tensile reinforcing material (see, for example, claim 1 of the claims and paragraphs [0010] to [0015] of the specification of patent literature 1).

Looking at claim 1 given in patent literature 1, at first glance, this looks like an invention that is applicable to concrete structures. However, looking at the composition of concrete described in the embodiment of patent literature 1, it can be seen that no coarse aggregates are mixed (see Tables 1 and 2 of patent literature 1). Usually, a composition like this is referred to as "mortar" or a "cement-based composition", rather than "concrete". Also, as patent literature 1 describes "using continuous fibers consisting of PVA fibers processed into a mesh as a tensile reinforcing material, . . . " (see paragraph [0016]), mesh-like continuous fibers corresponding to mortar or a cement-based composition are used, and the cover for the continuous fibers may be approximately 2 to 3 mm. When this cement-based composition is reinforced with continuous fibers, as described in paragraph [0003] of patent literature 1, "when a concrete member using the new material as the tensile reinforcing material reaches a maximum bending load, the fibers will break, and the bending load will be lost quickly (see FIG. 2)". This is a characteristic behavior that depends on the combination of a cement-based composition and mesh-like continuous fibers.

By contrast with this, the combination of materials which the present invention encompasses is not a cement-based composition and is normal concrete material containing fine aggregates and coarse aggregates. Also, the continuous fiber-reinforced polymer material according to the present invention is not mesh-like continuous fibers and is shaped like a strand or a rod. Consequently, the behavior of members with respect to bending load by the combination of concrete and the continuous fiber-reinforced polymer material according to the present invention is that the bending load is not lost quickly upon initial cracking, and, although the bending rigidity decreases upon bending cracking, the bending capacity continues increasing (see FIG. 8 of the drawings).

Furthermore, the short fibers disclosed in patent literature 1 naturally consider the balance with the cement-based composition, and, in the embodiment, PVA short fibers having a fineness of 100 dtex and a fiber length of 12 mm are used. When the diameter of the PVA fibers is calculated from the fineness, it becomes 0.1 mm, and the aspect ratio (fiber length/fiber diameter) is 120. Only cement-based compositions that contain no coarse aggregates can achieve required workability, by mixing fibers with an aspect ratio of 100 or more. That is, when concrete to contain coarse aggregates is used, there arises a problem that the required workability cannot be achieved when fibers having an aspect ratio of 100 or more are mixed in.

Also, in patent literature 2, as reinforcing fibers to mix in a cement-based matrix, a fiber-reinforced cement-based composite material using short fibers having a tensile modulus of 2.0 t/mm$^2$ or more with an added amount of 1.5% or more in volume % (Vf), and carbon-fiber-reinforced polymer bars or a carbon fiber mesh together, is disclosed (see, for example, claim 1 of the claims, and paragraphs [0014] to [0029] of the specification of patent literature 2).

However, the fiber-reinforced cement-based composite material described in patent literature 2 is also an invention to encompass a cement composition, similar to the cement composition mixed with short fibers, described in patent literature 1. That is, the invention described in patent literature 2 uses powdered silica sand or artificial lightweight aggregates as aggregates, as made clear by the term "cement-based material". Also, the continuous fibers are carbon-fiber-reinforced polymer bars or a carbon fiber mesh. Also, as described by the phrase "with a cover of approximately 0.2 mm" in paragraph [0035] of the specification, the arrangement is not one that can achieve sufficient strength of adhesion as in normal arrangement of reinforcing bars.

Also, as paragraph [0009] of patent literature 2 states that "a phenomenon occurs in which, after initial cracking of the cement-based material occurs, the bending capacity drops sharply and the stress is imposed on the continuous fibers, and the flexural modulus of the cement-based composite material changes quickly, and continuous stress is not transmitted to the reinforcing material", there is a problem similar to that of patent literature 1.

Also, patent literature 3 discloses a pre-stressed concrete slab, in which pre-stress is applied to fiber-reinforced concrete based on a pre-stressing scheme using a PC steel material (see, for example, claim 1 in the claims, paragraphs [0014] to [0031] of the specification, and FIG. 1, FIG. 2 in the drawings of patent literature 3).

The pre-stressed concrete slab described in patent literature 3 is directed to making it unnecessary to take into account the concrete cover for reinforcing bars and the distance between reinforcing bars by omitting the reinforcing bars by using fiber-reinforced concrete and improving the overall earthquake resistance of bridges by reducing the thickness of slabs and reducing the weight.

However, the pre-stressed concrete slab described in patent literature 3 is ultra-high-strength fiber-reinforced concrete, from, for example, claim 4, which recites that "the minimum member thickness of the plate part is 40 mm or less, . . . ", paragraph [0008], which describes that " . . . fiber-reinforced concrete is employed, so that the reinforcing bars can be omitted . . . ", and so forth. The concrete used in patent literature 3 is ultra-high-strength fiber-reinforced concrete. Ultra-high-strength fiber-reinforced concrete is a material that mixes a ultra-high-strength short fiber reinforcing material with a tensile strength of 2000 N/mm$^2$ class by approximately 2% in volume, in a cement-based composition with compressive strength of 200 N/mm$^2$ class, without using coarse aggregates, and that can omit the reinforcing bars. In order to solve the above-mentioned problem, patent literature 3 attempts to achieve weight reduction by forming grid-like ribs, consisting of vertical ribs and horizontal ribs formed on the lower surface of the plate part.

As described earlier, to realize an ultra-durable concrete slab that can withstand use for 100 years or more, it is ideal to use a continuous fiber-reinforced polymer material that does not rust. However, due to the mechanical shortcomings of a continuous fiber-reinforced polymer materials, concrete slabs, to which this is applied, have poor structural performance in various points such as shear capacity, bending rigidity, the stress at which bending cracks are produced, bending toughness performance, and so on, compared to conventional concrete slabs made of steel such as reinforcing bars and PC steel stranded wires.

CITATION LIST

Patent Literature

Patent Literature 1: Japanese Unexamined Patent Application Publication No. 2006-232562
Patent Literature 2: Japanese Unexamined Patent Application Publication No. 1994-64954

Patent Literature 3: Japanese Unexamined Patent Application Publication No. 2016-204925

SUMMARY OF INVENTION

Problem to be Solved by the Invention

So, the present invention has been made in view of the above-described problems, and it is therefore an object of the present invention to provide a concrete structure and a concrete slab, which, by using a continuous fiber-reinforced polymer material as a main reinforcing material or a tendon, and by mixing a short fiber reinforcing material in concrete, compensate for the mechanical shortcomings of the continuous fiber-reinforced polymer material, not rusting, and taking advantage of superior characteristics of the continuous fiber-reinforced polymer material, with low manufacturing cost and ultra-high durability.

Means for Solving the Problems

The concrete structure according to a first aspect of the invention is a concrete structure, in which a continuous fiber-reinforced polymer material is arranged as a main reinforcing material or a tendon, and which functions as a structure. In this concrete structure, a short fiber reinforcing plomyer material consisting of an organic fiber is mixed in 0.5% or more, and 2.5% or less, with respect to a concrete volume, the continuous fiber-reinforced polymer material is shaped like a rod or a stranded wire, a ratio Lf/Gm between a fiber length Lf of the organic fiber of the short fiber reinforcing material and a maximum aggregate diameter Gm of a concrete composition is 1.2 or more and 3.7 or less, and an aspect ratio Lf/De, in which De is an equivalent diameter that is a cross-sectional area of the organic fiber converted into a circle diameter, is 30 or more and 69 or less.

The concrete structure according to a second aspect of the invention is a concrete structure, in which a continuous fiber reinforcing material is arranged as a main reinforcing material or a tendon, and which functions as a structure. In this concrete structure, a short fiber reinforcing material consisting of an organic fiber is mixed in 0.5% or more, and 2.5% or less, with respect to a concrete volume, the continuous fiber-reinforced polymer material is shaped like a rod or a stranded wire, a ratio Lf/Gm between a fiber length Lf of the organic fiber of the short fiber reinforcing material and a maximum aggregate diameter Gm of a concrete composition is 1.2 or more and 3.7 or less, and a cross-sectional area of the organic fiber is 0.19 mm$^2$ to 0.79 mm$^2$.

The concrete slab according to a third aspect of the invention is a concrete slab, in which a continuous fiber-reinforced polymer material is arranged as a main reinforcing material or a tendon, and which functions as a structure. In this concrete slab, a short fiber reinforcing material consisting of an organic fiber is mixed in 0.5% or more, and 2.5% or less, with respect to a concrete volume, the continuous fiber-reinforced polymer material is shaped like a rod or a stranded wire, a ratio Lf/Gm between a fiber length Lf of the organic fiber of the short fiber reinforcing material and a maximum aggregate diameter Gm of a concrete composition is 1.2 or more and 3.7 or less, and an aspect ratio Lf/De, in which De is an equivalent diameter that is a cross-sectional area of the organic fiber converted into a circle diameter, is 30 or more and 69 or less.

The concrete slab according to a fourth aspect of the invention is a concrete slab, in which a continuous fiber-reinforced polymer material is arranged as a main reinforcing material or a tendon, and which functions as a structure. In this concrete slab, a short fiber reinforcing material consisting of an organic fiber is mixed in 0.5% or more, and 2.5% or less, with respect to a concrete volume, the continuous fiber-reinforced polymer material is shaped like a rod or a stranded wire, a ratio Lf/Gm between a fiber length Lf of the organic fiber of the short fiber reinforcing material and a maximum aggregate diameter Gm of a concrete composition is 1.2 or more and 3.7 or less, and a cross-sectional area of the organic fiber is 0.19 mm² to 0.79 mm².

Based on the concrete slab according to the third or fourth aspects of the invention, in the concrete structure according to a fifth aspect of the invention, the continuous fiber-reinforced polymer material comprises a carbon fiber or an aramid fiber.

Based on the concrete slab according to any one of the third to fifth aspects of the invention, in the concrete structure according to a sixth aspect of the invention, the organic fiber of the short fiber reinforcing material comprises a polypropylene fiber.

Based on the concrete slab according to any one of the third to sixth aspects of the invention, in the concrete structure according to a seventh aspect of the invention, pre-stress is introduced by the continuous fiber-reinforced polymer material.

Advantageous Effects of Invention

According to the first to seventh aspects of the invention, the tendon or the main reinforcing material does not rust and corrode, so that it is possible to provide a concrete structure or slab that is ultra-durable on the order of 100 years, and, furthermore, reduce the maintenance costs significantly.

Furthermore, according to the first to seventh aspects of the invention, the continuous fiber-reinforced polymer material has super-strength tensile strength characteristics equal to or higher than those of PC steel stranded wires, and is lightweight, so that it is possible to reduce the overall weight of the concrete structure or slab, and, furthermore, improve the earthquake resistance.

Moreover, according to the first to seventh aspects of the invention, short fiber-reinforced concrete is used, so that a short fiber-induced crack bridging performance is produced, with respect to the tensile stress produced in the short fiber-reinforced concrete. As a result of this, the tensile resistance stress increases with respect to the diagonal tensile stress produced in the concrete slab due to the cross-sectional shear force, and the shear capacity of the concrete structure increases.

In particular, according to the first and third aspects of the invention, the above-described desired crack bridging performance can be exhibited, and the workability of concrete can be ensured, with respect to the concrete having a normal composition in which coarse aggregates and fine aggregates are mixed.

In particular, according to the second and fourth aspects of the invention, it is possible to secure the tensile rigidity when the short fiber reinforcing material performs crack bridging. Also, it does not occur that the number of short fiber reinforcing materials is somewhat reduced, and a predetermined reinforcing effect cannot be extremely achieved.

BRIEF DESCRIPTION OF DRAWINGS

In FIG. 9A, a carbon-fiber-reinforced polymer material is used as a tendon. In FIG. 9B, a PC steel wire stranded wire is used as a tendon.

DESCRIPTION OF EMBODIMENTS

Hereinafter, embodiments for carrying out the concrete structure according to the present invention will be described in detail with reference to the accompanying drawings.

First Embodiment

Figure 1:
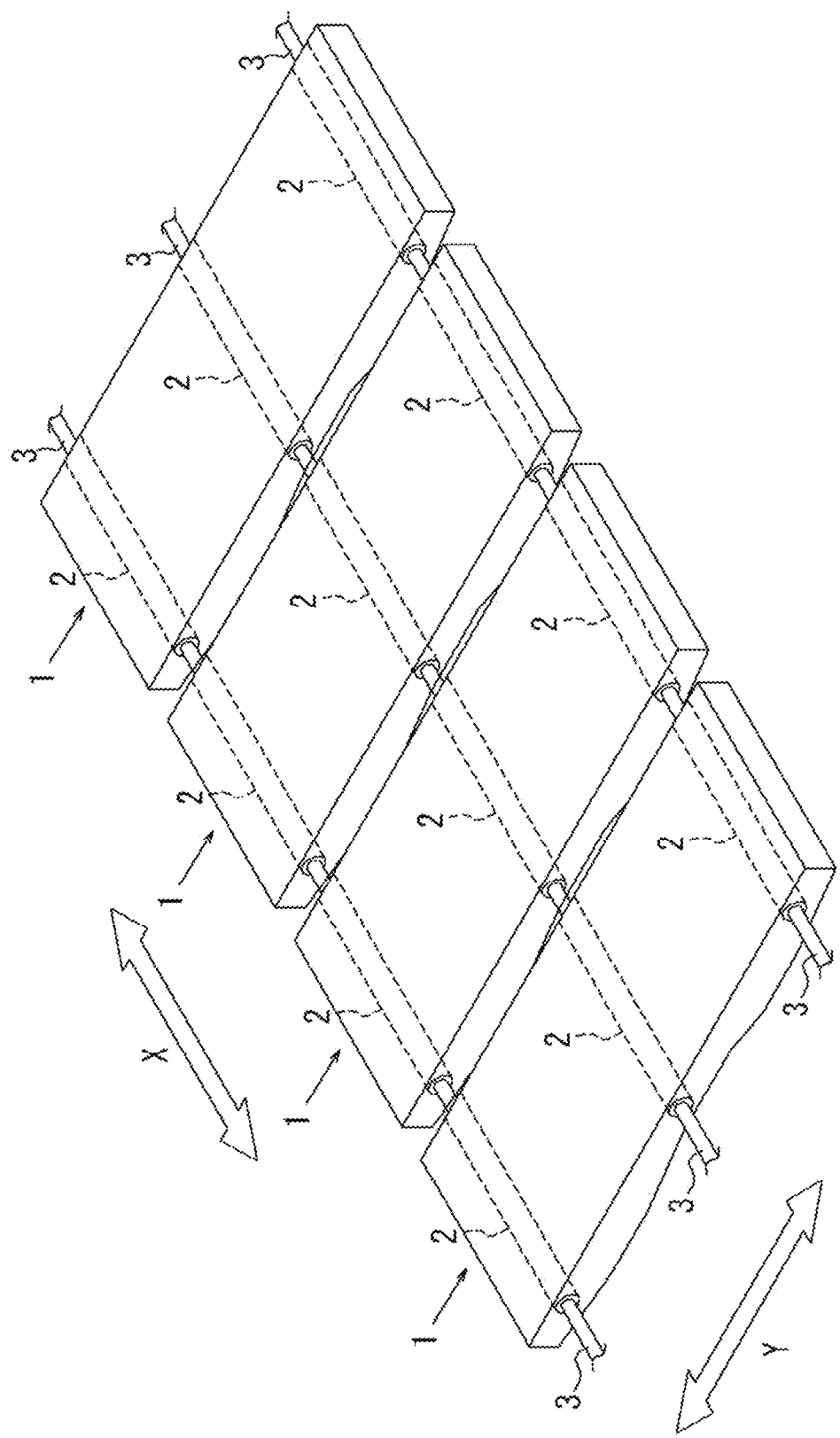
FIG. 1 is a perspective view to show a pre-stressed concrete slab according to a first embodiment of the present invention.

First, referring to FIG. 1, a pre-stressed concrete slab 1, exemplified as a concrete structure according to a first embodiment of the present invention, will be described below. FIG. 1 is a perspective view to show the pre-stressed concrete slabs 1 according to the first embodiment of the present invention. The pre-stressed concrete slabs 1 are used as concrete slabs to constitute a road bridge, a railway bridge, or a pier.

As shown in FIG. 1, where the X direction in the drawing is the bridge axis direction, a pre-stressed concrete slab 1 is a pre-cast slab of a plate shape that is, for example, placed on two main girders, having a plate thickness of approximately 20 to 35 cm, and having a span length of approximately 2.5 m to 3.5 m between main girders. Also, in the pre-stressed concrete slab 1, continuous fiber-reinforced polymer material stranded wires 3, which are a continuous fiber-reinforced polymer materials to serve as tendons, are arranged in a sheath 2, along the bridge axis direction X, and, as these continuous fiber-reinforced polymer material stranded wires 3 are tensioned based on a post-tension scheme, pre-stress is introduced in the bridge axis direction. However, the number of continuous fiber-reinforced polymer material stranded wires 3 in the drawing is significantly simplified and omitted, and, in reality, a plurality of continuous fiber-reinforced polymer material stranded wires 3 are arranged, at predetermined intervals, along the direction Y, perpendicular to the bridge axis.

Obviously, the pre-stressed concrete slab 1 is not limited to being a slab to be placed on two main girders and may be placed on a plurality of main girders. Also, the pre-stressed concrete slab 1 is not limited to being a pre-cast slab and may be a cast-in-place concrete slab. However, by using pre-cast slabs, the construction term for constructing or renewing a road bridge, a railway bridge or a pier can be shortened compared to when using cast-in-place concrete slabs.

(Continuous Fiber-Reinforced Polymer Material Stranded Wire)

The continuous fiber-reinforced polymer material stranded wire 3 is comprised of one core wire that constitutes a bear wire and a plurality of side wires that constitute the stranded wires twisted around the core wire and is a member in which a plurality of side wires are twisted so as to form stranded wires surrounding the core wire. This continuous fiber-reinforced polymer material stranded wire 3 is, for example, a stranded wire having a diameter of approximately 5 mm to 30 mm in a general portion.

Both the core wire and the side wire are resin-containing fiber bundles, in which a huge number of (for example, tens of thousands of) long continuous carbon fibers are bundled in a circular cross section, impregnated with thermosetting resins or thermoplastic resins. The whole continuous fiber-reinforced polymer material stranded wire 3 includes hundreds of thousands of carbon fibers. Each carbon fiber is very thin, having, for example, a diameter of 5 μm to 7 μm. It may be possible to say that the continuous fiber-reinforced polymer material stranded wire 3 is made of carbon fiber-reinforced plastic.

However, for the continuous fiber-reinforced polymer material stranded wire 3, aramid fibers or glass fibers may be used instead of carbon fibers. For the thermosetting resins, for example, epoxy resin, vinyl ester resin and/or the like are used. For the thermoplastic resins, for example, polycarbonate, polyvinyl chloride and/or the like are used.

As described earlier, the continuous fiber-reinforced polymer material refers to an FRP (Fiber-Reinforced Plastic) reinforcing material, which is a composite material to bundle and impregnate continuous fibers such as carbon fibers, aramid fibers and glass fibers with a resin such as epoxy resin, vinyl ester resin, methacrylic resin, polycarbonate resin, and vinyl chloride.

Note that, although continuous fiber-reinforced polymer material stranded wires, shaped like strands (strand-shaped), have been described as an example of a continuous fiber-reinforced polymer material, the continuous fiber-reinforced polymer material according to the present invention may be also shaped like a rod (rod-shaped). However, if the continuous fiber-reinforced polymer material is shaped like stranded wires, there is less risk that all the side wires will break at once, so the risk of breakage is reduced compared to rod-shaped ones.

(Short Fiber-Reinforced Concrete)

As is the case with the pre-stressed concrete slab 1, important material and structural performance that a concrete slab should exhibit include having high durability performance against chloride-induced corrosion and being highly resistant to punching cross-sectional shear force or normal cross-sectional shear force. In particular, in case of concrete slabs of highway bridges, the fatigue of concrete slabs due to the running wheel load of heavy vehicles such as trucks has become a problem. That is, it is required to keep the fatigue and damage to a minimum in the presumed of duration of use, avoid the work of replacing the concrete slabs.

As mentioned earlier, when a continuous fiber-reinforced polymer material is used to give high durability to concrete, since the continuous fiber-reinforced polymer material has low shear rigidity and shear capacity, little dowel effect can be expected from the continuous fiber-reinforced polymer material. As a result of this, there has been a problem that the shear capacity of concrete slabs decreases.

Also, continuous fiber-reinforced polymer materials have high tensile strength compared to reinforcing bars and PC steel stranded wires, and, furthermore, have no yield point. It then follows that, when a continuous fiber-reinforced polymer material is used for a main tensile reinforcing bar or a tendon in a concrete slab, no behavior of bending toughness is exhibited, which reinforcing bars or PC steel twisted wires show after the yield point of the tensile material, with respect to the cross-sectional bending moment force, leading to brittle bending failure because concrete crushing occurs on the compression side.

Consequently, with the pre-stressed concrete slab 1, short fiber-reinforced concrete, in which a certain proportion of a short fiber reinforcing material is mixed, is used as fresh concrete to be cast (before curing). This is because, by mixing a short fiber reinforcing material in concrete, it is possible to compensate for the mechanical shortcomings of the continuous fiber-reinforced polymer material due to the fact that, as mentioned earlier, the dowel effect of the continuous fiber-reinforced polymer material cannot be expected. That is, by mixing a short fiber reinforcing material, it is possible to prevent a decrease in the shear capacity of the pre-stressed concrete slab 1 and improve the mode of failure from shear failure mode to bending failure mode having high toughness.

In short, by using short fiber-reinforced concrete like with the pre-stressed concrete slabs 1, the short fiber reinforcing material exerts a crack bridging performance in concrete. By means of the crack bridging effect, tensile resistance stress is maintained against relatively large tensile strain, even after bending cracking. Consequently, to resist the bending tensile stress, the bending toughness of the concrete slabs can be improved without a sudden decrease of bending capacity.

Here, the short fiber reinforcing material to mix in concrete is not corroded by the chloride ions that enter from outside, because the material is not metal fibers but is organic fibers, and therefore can maintain high durability as concrete slabs. Also, spot rust on the surface of concrete, which is often seen with short fiber reinforcing materials of metal, is not produced, so that the appearance of the concrete surface can be maintained.

Note that the fresh concrete to cast is concrete of normal composition, comprised of, for example, coarse aggregates such as gravel and crushed stones with a maximum aggregate diameter of 13 mm to 20 mm, fine aggregates such as sand and crushed sand, admixtures such as cement, water, fly ash and blast furnace slag, and other admixtures such as AE water reducing agent, high-performance water reducing agent, and so forth.

Also, the amount of the short fiber reinforcing material to mix in concrete is 0.5% or more in the volume ratio, with respect to the volume of concrete. The reason 0.5% or more is mixed in the volume ratio is that the above-mentioned predetermined mechanical performance as short fiber-reinforced concrete can be achieved by mixing 0.5% or more.

Note that the upper limit of the volume mixing rate may be approximately 2.0% to 2.5%. This is because, if the amount of the short fiber reinforcing material to mix in increases, the workability such as slump decreases, and, furthermore, malfunctional phenomena such as formation of fiber balls arise.

(Short Fiber Reinforcing Material)

The short fiber reinforcing material to mix in concrete is short fibers consisting of organic fibers comprised of organic materials. The short fiber reinforcing material to use for the pre-stressed concrete slab 1 of the present embodiment employs short fibers, whose adhesion performance to concrete is improved by embossing the surface of polypropylene fibers (PP fibers). Obviously, the short fiber reinforcing material is not limited to being polypropylene fibers, and other organic fibers such as polyvinyl alcohol fibers (PVA fibers) and polyethylene fibers (PE fibers) may be used as well.

Also, for the short fiber reinforcing material, a material, in which the ratio of the fiber length Lf of the organic fibers and the maximum aggregate diameter Gm of the concrete composition, Lf/Gm, is 1.2 to 3.7, is used. The fiber length of the organic fibers is defined by the ratio to the maximum aggregate diameter of concrete, for the following reasons. The first reason is that the organic short fiber reinforcing material, unless larger than the maximum aggregate diameter to some extent, is not expected to provide much crack bridging performance in concrete, and cracks will increase and be localized at the boundary between the maximum aggregate and the cement-based matrix. Also, the second reason is that, if the relative ratio is too large, the short fiber length becomes too long, resulting in increased risk of fiber balls being produced, and a decline in the number of short fiber reinforcing materials, leading to reduced crack bridging performance.

Moreover, the short fiber reinforcing material specifies the shape parameter of the aspect ratio for short fibers. That is, for the short fiber reinforcing material, a material having an aspect ratio of Lf/De=30 to 69, where the cross-sectional area of organic fibers is converted into an equivalent circular diameter, De, is used. The reason the shape parameter of the aspect ratio is defined like this is that it is possible to exhibit the above-described desired crack bridging performance, and ensure the workability of concrete, with respect to concrete mixing coarse aggregates and fine aggregates in normal composition.

According to the pre-stressed concrete slab 1, which is a concrete structure according to the first embodiment of the present invention described above, a continuous fiber-reinforced polymer material stranded wire 3 is used as a tendon. Consequently, the tendon does not rust and corrode, and it is possible to provide a slab that is ultra-durable on the order of 100 years, and, furthermore, reduce the maintenance costs significantly.

Also, according to the pre-stressed concrete slab 1, the continuous fiber-reinforced polymer material stranded wire 3 has super-strength tensile strength characteristics equal to or higher than those of PC steel stranded wires, and are lightweight, so that, with the pre-stressed concrete slab 1, it is possible to reduce the overall weight of the slab, and, furthermore, improve the earthquake resistance.

In addition, according to the pre-stressed concrete slab 1, short fiber-reinforced concrete is used, so that a short fiber-induced crack bridging performance is produced, with respect to the tensile stress produced in the short fiber-reinforced concrete. As a result of this, the tensile resistance stress increases with respect to the diagonal tensile stress produced in the concrete slab due to the cross-sectional shear force, and the shear capacity of the pre-stressed concrete slab 1 increases.

Note that, for the conventional method of increasing the shear capacity in concrete slabs using a continuous fiber-reinforced polymer material, generally, the method of arranging shear reinforcing bars (stirrups) has been used. That is, in the event a continuous fiber-reinforced polymer material is used in concrete slabs, it is necessary to dispose stirrups of the continuous fiber-reinforced polymer material to improve the shear capacity required by the design. However, stirrups made of a continuous fiber-reinforced polymer material require a special bending process and are costly, and, in addition, the stirrups must be arranged to intersect the main tensile reinforcing bars of the continuous fiber-reinforced polymer material, and therefore a great deal of labor is required for the work of arranging the reinforcing bars. Consequently, the cost of shear reinforcement becomes, inevitably, expensive.

However, the pre-stressed concrete slab 1 makes use of short fiber-reinforced concrete, which makes stirrups of a continuous fiber-reinforced polymer material unnecessary. Also, short fiber-reinforced concrete can ensure sufficient workability required for casting concrete, so that it is possible to make concrete slabs in the same working environment as for conventional plain concrete. Moreover, since the price of short fiber reinforcing materials is low, it is possible to reduce the cost significantly, and improve the efficiency of work.

In addition, according to the pre-stressed concrete slab 1, the continuous fiber-reinforced polymer material stranded wires 3 are used as tendons, and short fiber-reinforced concrete is used for this, so that the members that are equivalent to conventional distribution bars can be omitted. Consequently, given that distribution reinforcing bars need not be arranged, the manufacturing cost and material cost can be reduced, so that it is possible to contribute to cost reduction and improve the efficiency of work significantly.

Note that, in the event a concrete slab uses PC steel stranded wires as tendons in conventional normal concrete, it is necessary to arrange distribution bars outside the PC steel stranded wires, in addition to the PC steel stranded wires for tension. This is because, when the bending moment in the use limit state or the cross-sectional force of the shear force acts on the concrete slab, it is necessary to control the expansion of bending crack width and provide an auxiliary role with respect to shear capacity.

In particular, in the event concrete slabs are used for highway bridges, the load bearing performance against wheel load fatigue is important, and the punching shear capacity performance is an important factor that is required for the concrete slabs. In conventional concrete slabs in which pre-stress is introduced by PC steel stranded wires, it is important to arrange distribution bars to improve this load bearing performance against punching shear.

However, by contrast with this, with the pre-stressed concrete slab 1, conventional concrete is replaced with short fiber-reinforced concrete, and a crack bridging performance is produced by the short fiber reinforcing material against the tensile stress produced in the concrete. Consequently, even after bending cracking and shear cracking occur, the crack width may be controlled, making it unnecessary to arrange the distribution bars.

Furthermore, with the pre-stressed concrete slab 1, the crack bridging performance of the short fiber-reinforced concrete with concrete sufficiently resists the peeling failure caused by the punching shear, without arranging conventional distribution bars, and predetermined punching shear capacity can be achieved.

Note that, although, as a pre-stressed concrete slab 1, an example has been shown, in which pre-stress is introduced in the bridge axial direction X, based on a post-tension scheme, by means of continuous fiber-reinforced polymer material stranded wires 3, it is also possible, in addition to that, to introduce pre-stress, in the direction Y perpendicular to the bridge axis in FIG. 1, by using the continuous fiber-reinforced polymer material, based on a pre-tension scheme.

Second Embodiment

Figure 2:
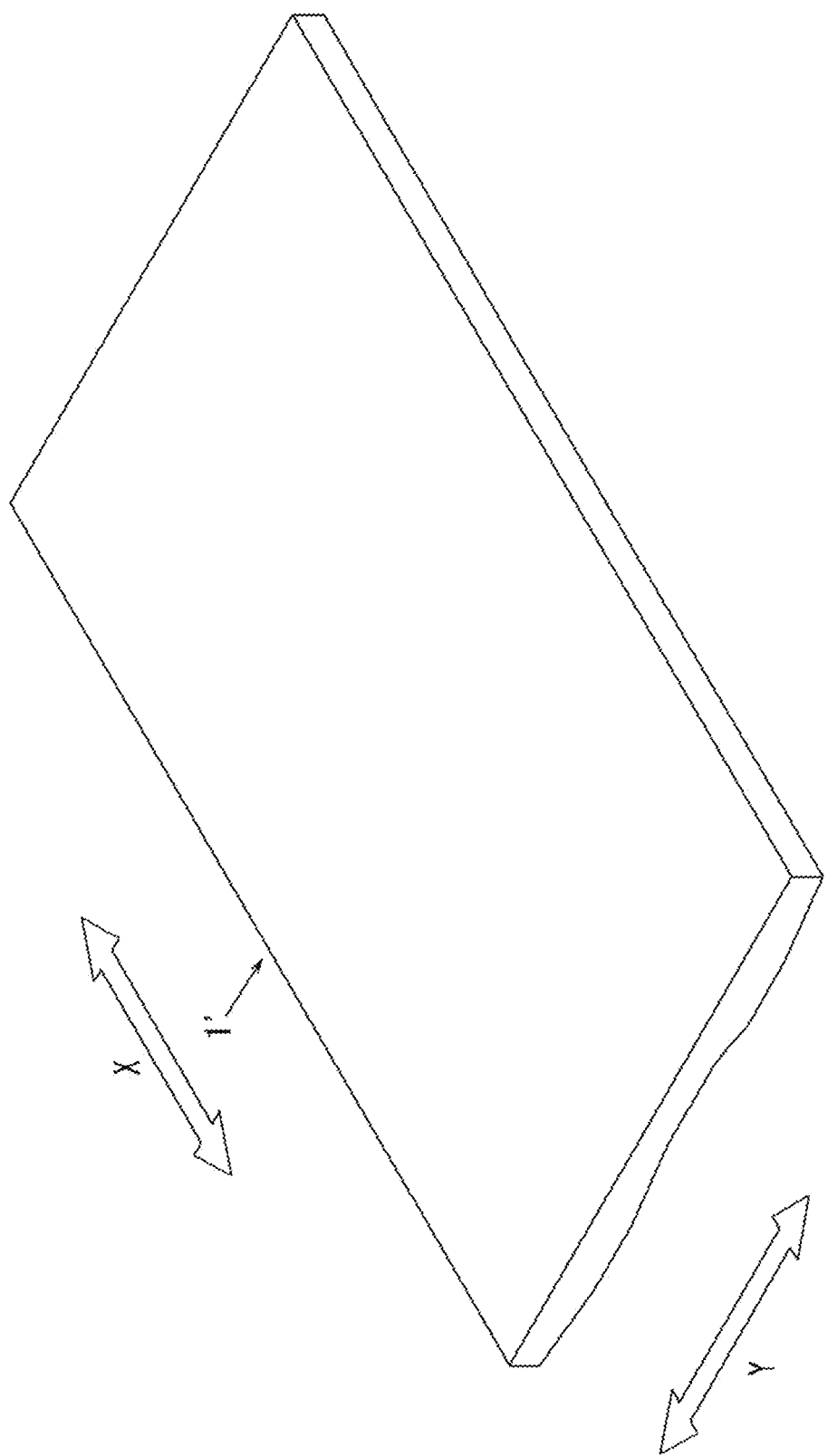
FIG. 2 is a perspective view to show a concrete slab according to a second embodiment of the present invention.

Next, referring to FIG. 2, a concrete slab 1', exemplified as a concrete structure according to a second embodiment of the present invention, will be described below. FIG. 2 is a perspective view to show a concrete slab 1' according to the second embodiment of the present invention.

As shown in FIG. 2, where the X direction in the drawing is the bridge axis direction, the concrete slab 1' is a cast-in-place concrete slab of a plate shape that is, for example, placed on two main girders, having a plate thickness of approximately 20 to 35 cm, and having a span length of approximately 2.5 m to 3.5 m between main girders.

(Continuous Fiber-Reinforced Polymer Material Stranded Wire)

Also, the concrete slab 1' is provided with the above-described continuous fiber-reinforced polymer material stranded wire (not shown) as a main reinforcing material (main tensile reinforcing material) that mainly bears the tensile force and provides internal reinforcement. The continuous fiber-reinforced polymer material stranded wire does not rust, so that the concrete cover can be made thinner than heretofore, because a minimal concrete cover suffices to secure the adhesion performance of the continuous fiber-reinforced polymer material stranded wire. Also, the specific weight of the continuous fiber-reinforced polymer material stranded wire is approximately ⅕ that of steel materials. Consequently, the pre-stressed concrete slab 1' can achieve weight reduction.

Note that the continuous fiber-reinforced polymer material stranded wire is the same as that described earlier, and therefore the detailed description thereof will be omitted. Although continuous fiber-reinforced polymer material stranded wires, shaped like strands (strand-shaped), have been described as an example of a continuous fiber-reinforced polymer material according to the present invention, the continuous fiber-reinforced polymer material according to the present invention may be also shaped like a rod (rod-shaped). However, if the continuous fiber-reinforced polymer material is shaped like stranded wires, there is less risk that all the side wires will break at once, so the risk of breakage is reduced compared to rod-shaped ones.

(Short Fiber-Reinforced Concrete)

Furthermore, with concrete slab 1', as with the pre-stressed concrete slab 1 described above, short fiber-reinforced concrete, in which a certain proportion of a short fiber reinforcing material is mixed, is used as fresh concrete to be cast (before curing). This is because, by mixing a short fiber reinforcing material in concrete, it is possible to compensate for the mechanical shortcomings of the continuous fiber-reinforced polymer material due to the fact that, as mentioned earlier, the dowel effect of the continuous fiber-reinforced polymer material cannot be expected. That is, by mixing a short fiber reinforcing material, it is possible to prevent a decrease in the shear capacity of the concrete slab 1' and improve the mode of failure from shear failure mode to bending failure mode having high toughness.

Note that the fresh concrete to cast is normal mixed design concrete, comprised of, for example, coarse aggregates such as gravel and crushed stones with a maximum aggregate diameter of 13 mm to 20 mm, fine aggregates such as sand and crushed sand, admixtures such as cement, water, fly ash and blast furnace slag, and other admixtures such as AE water reducing agent, high-performance water reducing agent, and so forth.

Also, the amount of the short fiber reinforcing material to mix in concrete is 0.5% or more in the volume ratio, with respect to the volume of concrete. The reason 0.5% or more is mixed in the volume ratio is that the above-mentioned predetermined mechanical performance as short fiber-reinforced concrete can be achieved by mixing 0.5% or more.

Note that the upper limit of the volume mixing rate may be approximately 2.0% to 2.5%. This is because, if the amount of the short fiber reinforcing material to mix in increases, the workability such as slump decreases, and, furthermore, malfunctional phenomena such as formation of fiber balls arise.

(Short Fiber Reinforcing Material)

Like the pre-stressed concrete slab 1 described above, the short fiber reinforcing material to mix in concrete is short fibers consisting of organic fibers comprised of organic materials. The short fiber reinforcing material to use for the concrete slab 1' of the present embodiment employs short fibers, whose adhesion performance to concrete is improved by embossing the surface of polypropylene fibers (PP fibers). Obviously, the short fiber reinforcing material is not limited to being polypropylene fibers, and other organic fibers such as polyvinyl alcohol fibers (PVA fibers) and polyethylene fibers (PE fibers) may be used as well.

Also, for the short fiber reinforcing material to use for the concrete slab 1', organic fibers having a cross-sectional area of 0.19 $mm^2$ to 0.79 $mm^2$ are used. The reason to define the cross-sectional area of the organic fibers is to ensure tensile rigidity when the short fiber reinforcing material is cross-linked. If the cross-sectional area is smaller than 0.19 $mm^2$, predetermined tensile rigidity cannot be achieved, and, consequently, the crack width increases, and a predetermined reinforcing effect cannot be achieved. On the other hand, if the cross-sectional area is larger than 0.79 $mm^2$, predetermined tensile rigidity can be achieved for each fiber, but the number of short fiber reinforcing materials decreases, and a predetermined reinforcing effect cannot be achieved.

According to the concrete slab 1' which is a concrete structure according to the second embodiment of the present invention described above, a continuous fiber-reinforced polymer material stranded wire is used as a main reinforcing material, so that the main reinforcing material does not rust, and it is possible to provide a slab that is ultra-durable on the order of 100 years, and, furthermore, reduce the maintenance costs significantly.

Furthermore, the concrete slab 1' has much higher tensile strength characteristics than conventional reinforcing bars and PC steel stranded wires, and therefore the concrete slab 1' is not only lightweight having a specific weight of approximately ⅕, but also can reduce the concrete cover to a degree where the adhesion of the continuous fiber-reinforced polymer material stranded wire can be secured. Consequently, with the concrete slab 1', the overall weight of the slab can be reduced, and the seismic resistance can be improved by reducing the burden on the substructure.

In addition, according to the concrete slab 1', short fiber-reinforced concrete is used, so that a short fiber-induced crack bridging performance is produced, with respect to the tensile stress produced in the short fiber-reinforced concrete. As a result of this, the tensile resistance stress increases with respect to the diagonal tensile stress produced in the concrete slab due to the cross-sectional shear force, and the shear capacity of the concrete slab 1' increases.

Note that, for the conventional method of increasing the shear capacity in concrete slabs using a continuous fiber-reinforced polymer material, generally, the method of arranging shear reinforcing bars (stirrups) has been used. That is, in the event a continuous fiber-reinforced polymer material is used in concrete slabs, it is necessary to dispose stirrups of the continuous fiber-reinforced polymer material to improve the shear capacity required by the design. However, stirrups made of a continuous fiber-reinforced polymer material require a special bending process and are costly, and, in addition, the stirrups must be arranged to intersect the main tensile reinforcing bars of the continuous fiber-reinforced polymer material, and therefore a great deal of labor is required for the work of arranging the reinforcing bars. Consequently, the cost of shear reinforcement becomes, inevitably, expensive.

However, the concrete slab 1' makes use of short fiber-reinforced concrete, which makes stirrups of a continuous fiber-reinforced polymer material unnecessary. Also, short fiber-reinforced concrete can ensure sufficient workability required for casting concrete, so that it is possible to make concrete slabs in the same working environment as for conventional plain concrete. Moreover, since the price of short fiber reinforcing materials is low, it is possible to reduce the cost significantly, and improve the efficiency of work.

<Bending Loading Experiment>

Figure 3:
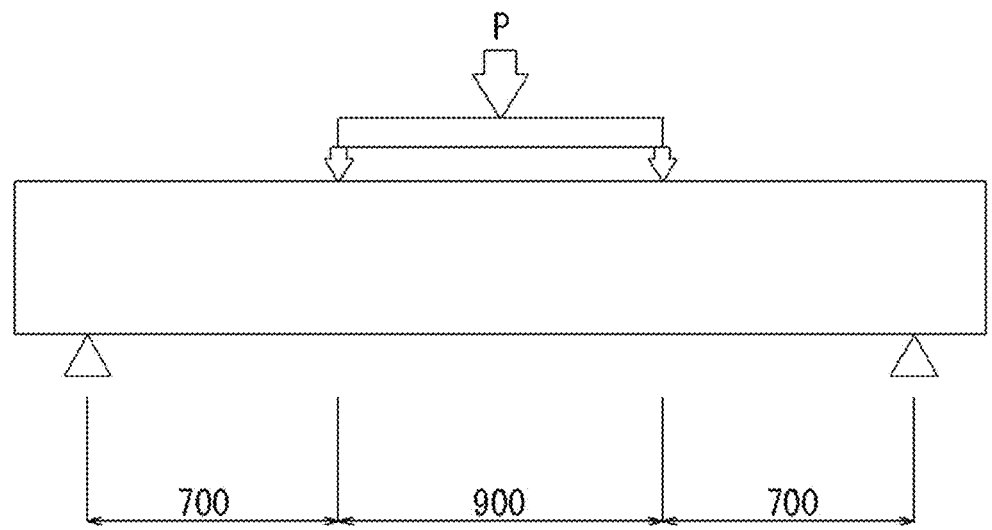
FIG. 3 is an experimental overview to show the situation of loading in a bending loading experiment.
Figure 4:
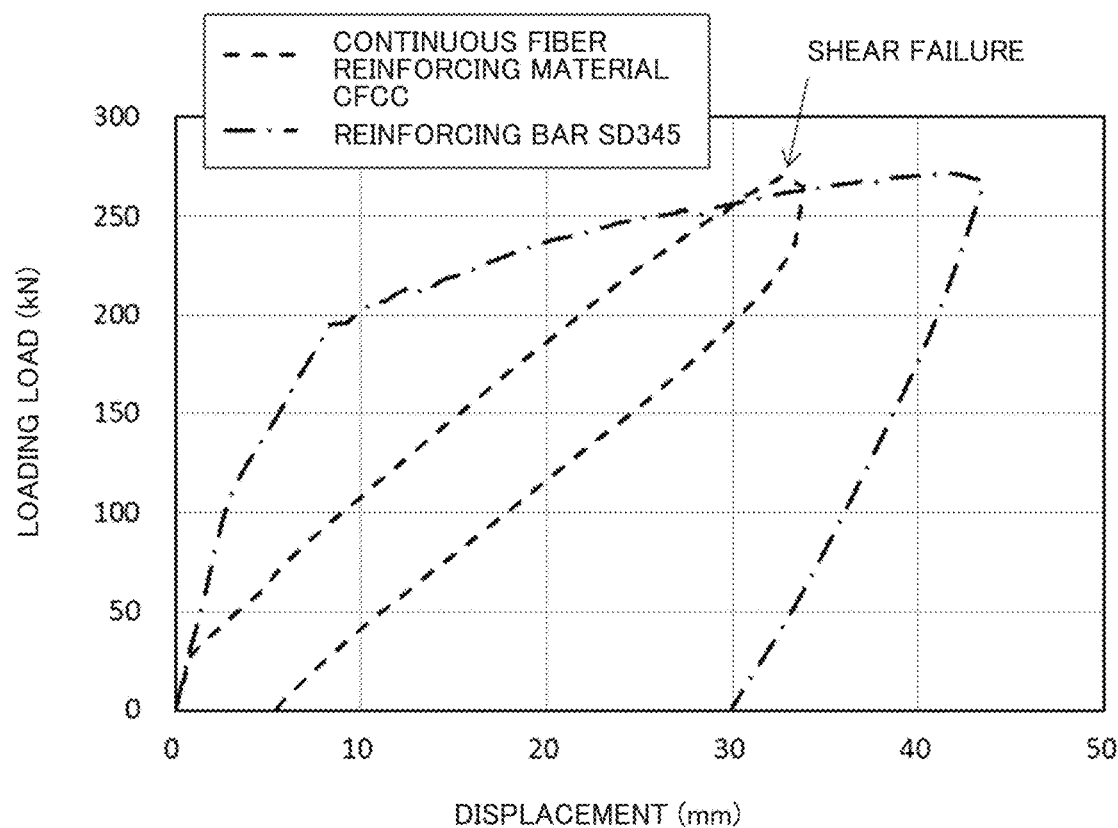
FIG. 4 is a graph to show the load displacement curves in a bending loading comparison experiment between a concrete slab to use a continuous fiber-reinforced polymer material as a main reinforcing material and a concrete slab to use conventional reinforcing bars.
Figure 5:
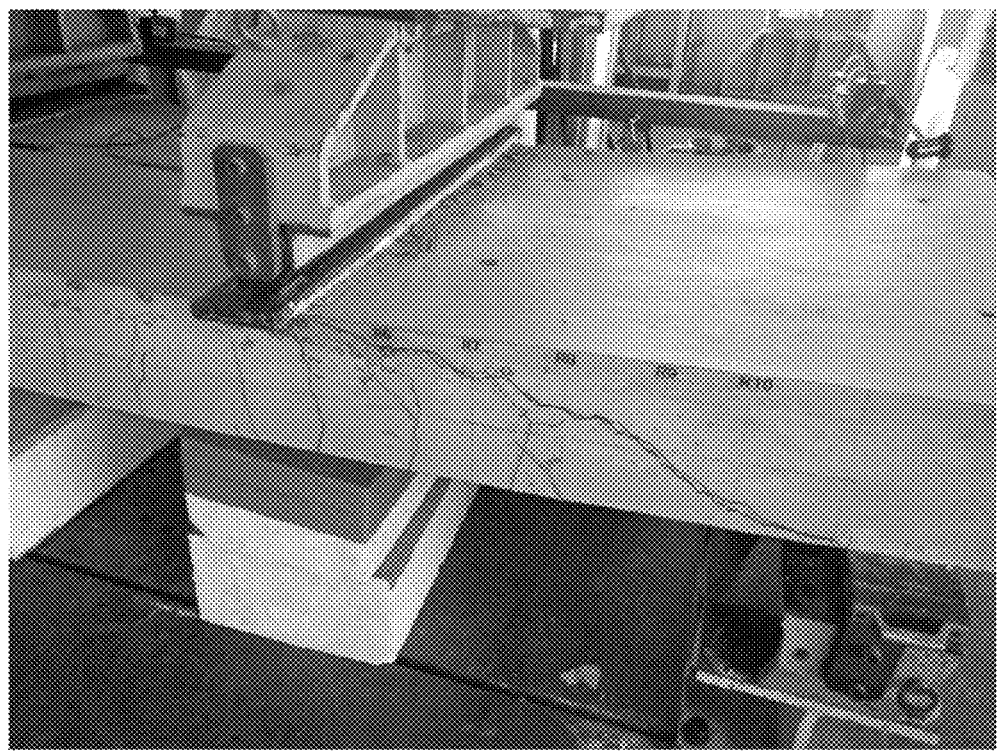
FIG. 5 is a photograph to show the situation in which a concrete slab to use a continuous fiber-reinforced polymer material as a reinforcing material undergoes shear failure in a bending loading experiment.

Next, referring to FIG. 3 to FIG. 5, a bending loading experiment for demonstrating the problem of continuous fiber-reinforced polymer materials will be described. To be more specific, a bending loading comparison experiment between a concrete slab to use a continuous fiber-reinforced polymer material as a main reinforcing material, and a concrete slab to use conventional reinforcing bars will be described below. FIG. 3 is an experimental overview to show the situation of loading in the bending loading experiment. FIG. 4 is a graph to show the load displacement curves in the bending loading comparison experiment between the concrete slab to use a continuous fiber-reinforced polymer material as a main reinforcing material and the concrete slab to use conventional reinforcing bars. Furthermore, FIG. 5 is a photograph to show the situation in which the concrete slab to use a continuous fiber-reinforced polymer material as a reinforcing material undergoes shear failure in the bending loading experiment.

Experimental specimens of concrete slabs using two different types of main tensile reinforcing materials were prepared, and a bending loading experiment was conducted on these two concrete slabs, and the mechanical behaviors of the two were compared. One of the specimens was a concrete slab (hereinafter referred to as "RC slab") with conventional reinforcing bars, and the other specimen was a concrete slab (hereinafter referred to as "CFCC slab") using a continuous fiber-reinforced polymer material, which has higher tensile strength than the reinforcing bar material.

The external dimensions of the specimens of these concrete slabs are length×width×thickness=2700×900×180 mm. For the reinforcing bars, D19 (with a core cover of the lower bar 45 mm, N=5 bars) and D16 (with a core cover of the upper bar 43 mm, N=5 bars) of deformed reinforcing bar material SD345 were used. For the continuous fiber-reinforced polymer material, a strand-shaped carbon-fiber-reinforced polymer material (abbreviated as "CFCC" (Carbon Fiber Composite Cable)) having a diameter of $\varphi 15.2$ mm and a core cover 38 mm, N=5 cables were used for both upper and lower cables. The situation of spanning of bending loading is shown in the schematic diagram of FIG. 3. The concrete used was normal mix design high-strength concrete, and the compressive strength was 71 N/mm$^2$ (RC slab) and 74 N/mm$^2$ (CFCC slab).

FIG. 4 shows the relationship between the loading load and the displacement of the center point in the bending loading experiment. The failure loads of both concrete slabs were substantially the same, just under 275 kN. However, the RC slab exhibited bending failure mode due to the crushing of the compression side concrete, whereas the CFCC slab exhibited shear failure mode, due to the expansion of diagonal shear cracks produced in the shear section.

FIG. 5 shows the situation of shear failure of the CFCC slab. From this photograph, it is clear that the CFCC slab had a typical shear failure. From the results of the loading load-displacement relationship shown in FIG. 4, the mechanical behavior of both concrete slabs can be considered as follows.

1) In the concrete slab shown in FIG. 3, under loading conditions with long side spans, the bending cross-sectional force surpasses the cross-sectional shear force, and, considering that the reinforcing bars of the RC slab are normal reinforcing bars, and the thickness of the RC slab, being failure is inevitable. The shear resistance of the RC slab primarily arises from the shear resistance of concrete and the dowel effect of the main reinforcing bar. On the other hand, with the CFCC slab, because CFCC $\varphi 15.2$ arranged on the lower side shows sufficient tensile resistance performance with respect to the bending cross-sectional force, the resistance performance against bending may be substantially equal to or greater than that of the RC slab. Also, regarding the shear resistance of the CFCC slab, while it is possible to take the concrete-induced shear resistance into account, the shear rigidity and shear capacity of CFCC, which are material characteristics of CFCC, are extremely small, and therefore not much CFCC-induced dowel effect can be expected. As a result of this, it is more likely that the CFCC slab had undergone shear failure rather than bending failure.

2) Since the bending rigidity of concrete itself contributes to the initial rise of the load-displacement curve before bending cracking occurs, there is no difference in gradient between the two. However, following that, after bending cracks are formed in the concrete slabs, there is a big difference between the two. The gradients of the two from the load of 25 kN to 100 kN were examined. The gradient of the RC slab=74.5/2.0=37 kN/mm, and, on the other hand, the gradient of the CFCC slab=75.2/8.3=9 kN/mm From this, the gradient ratio between the RC slab and the CFCC slab is P/δ ratio=37/9=4.1. Meanwhile, when the EA ratio of the RC slab's reinforcing bar elastic modulus $E_s$ and cross-sectional area $A_s$, and the CFCC slab's CFCC elastic modulus $E_f$ and cross-sectional area $A_f$ is calculated, $E_s A_s / E_f A_f = 264.5/85.6 = 4.2$ is given. That is, it can be seen that the bending rigidity (flexibility) of the concrete slab that is not pre-stressed depends on the tensile rigidity EA of the tensile reinforcing material, as can be theoretically inferred.

3) The RC slab shows a moderate gradient where the load is around 200 kN. This is a result of the reinforcing bar SD345 reaching the yield point and the tensile rigidity decreasing. On the other hand, with the CFCC slab, the load increases linearly up to the vicinity of the shear-breaking load of 270 kN. This is because CFCC has no yield point. The fact that the reinforcing bar (steel material) has a yield point and has expandability provides bending toughness performance for the bending behavior of the slab consequently, and this is one important performance. On the other hand, CFCC does not have a yield point and has limited expandability, and so CFCC is disadvantageous when used as a tensile reinforcing material for reinforced concrete slabs.

4) In both load curves, the unloading history after bending failure of the RC slab and after shear failure of the CFCC slab. It can be seen that the CFCC slab shows slight residual displacement after unloading, while the RC slab shows significant residual displacement after unloading. For example, when both concrete slabs are repeatedly loaded by alternating positive and negative loads, the CFCC slab shows a small hysteresis curve, and the RC slab shows a large hysteresis curve from their loading history. In other words, if the CFCC slab (CFCC concrete structure) remains as a CFCC slab (CFCC concrete structure) that combines, as heretofore, conventional concrete used at present, with CFCC that serves as a tendon, the hysteresis curve will be moderate, which is disadvantageous when, for example, a continuous fiber-reinforced polymer material is used as a tensile reinforcing material in a structure that encounters earthquakes.

Example 1

Figure 6:
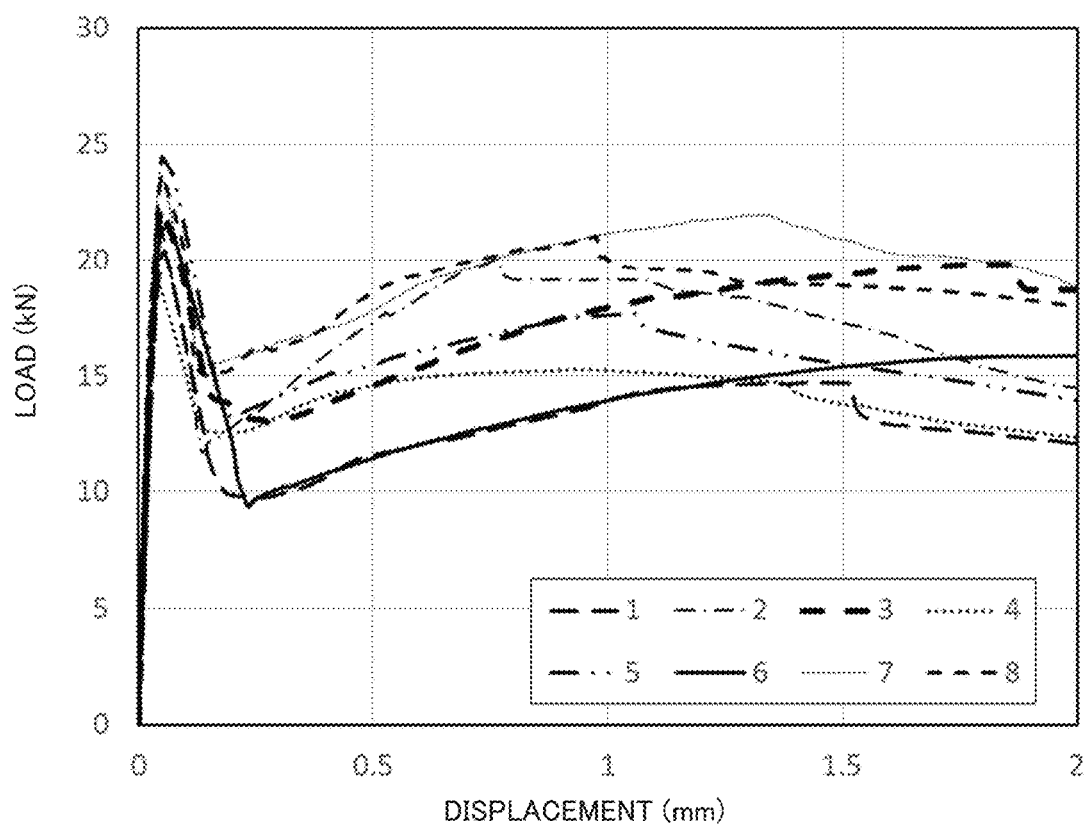
FIG. 6 is a graph to show the relationship between the loading load and the displacement of the center point in a bending toughness test.

From the result of the bending loading experiment of the RC slab and the CFCC slab described above, the problems to be solved by the invention were quantitatively shown. In example 1, the composition of the basic short fiber-reinforced concrete is composed in a selected manner, and its characteristics are evaluated by a bending toughness test. FIG. 6 is a graph to show the relationship between the loading load and the displacement of the center point in the bending toughness test.

An important point of the present invention is to provide ultra-durable concrete slab by using the combination of materials that are not corroded by rust, such as continuous fiber-reinforced polymer materials. Consequently, the use of metal fibers for the short fiber reinforcing material will not be considered here. In Table 1, the polypropylene fiber (PP fiber) is selected as the short fiber reinforcing material, and by combining factors such as the short fiber's cross-sectional area Af (mm$^2$), an equivalent diameter De (mm), which is the cross-sectional area converted into a circular diameter, the length Lf (mm) of the short fiber, the volume mixing ratio Vf (%) of the short fiber mixed in the concrete, and so forth, standards that may be valid, such as the short fiber reinforcing material's shape parameter, are shown. As for the method of assigning numbers to the specimens', specimens having the volume mixing ratio Vf of 0.5% of the short fiber were designated as G1-*, and specimens having the volume mixing ratio of 1.0% were designated as G2-*. Also, specimens in which PP fibers of different shapes were combined and the total volume mixing ratio Vf was 1.0% were designated as G3-*.

The composition and slump of plain concrete before mixing the PP fibers are as follows: the water/binder ratio=W/B=35 to 37%, the sand/aggregate ratio=s/A=49 to 51%, the maximum aggregate diameter Gm=13 mm and 20 mm, the unit binder amount B=432 to 471 kgf/m$^3$, and the slump=21 to 23 cm.

Furthermore, the slump after mixing the short fiber reinforcing material=12 to 22 cm, the compressive strength=68 to 85 N/mm$^2$, and the average compressive strength=74 N/mm$^2$.

TABLE 1

| Specimen No. | Amount of fiber mixed Vf (%) | Cross-sectional area Af (mm$^2$) | Equivalent diameter De (mm) | Length Lf (mm) | Maximum aggregate diameter Gm (mm) | Lf/De | Lf/Gm |
|---|---|---|---|---|---|---|---|
| G1-1 | 0.5 | 0.19 | 0.5 | 30 | 20 | 60 | 1.5 |
| G1-2 | 0.5 | 0.19 | 0.5 | 30 | 13 | 60 | 2.3 |
| G1-3 | 0.5 | 0.19 | 0.5 | 30 | 13 | 60 | 2.3 |
| G1-4 | 0.5 | 0.39 | 0.7 | 48 | 13 | 69 | 3.7 |
| G1-5 | 0.5 | 0.39 | 0.7 | 30 | 13 | 43 | 2.3 |
| G1-6 | 0.5 | 0.19 | 0.5 | 30 | 13 | 60 | 2.3 |
| G1-7 | 0.5 | 0.39 | 0.7 | 48 | 20 | 69 | 2.4 |
| G1-8 | 0.5 | 0.19 | 0.5 | 30 | 13 | 60 | 2.3 |
| G2-1 | 1.0 | 0.19 | 0.5 | 30 | 20 | 60 | 1.5 |
| G2-2 | 1.0 | 0.19 | 0.5 | 30 | 13 | 60 | 2.3 |
| G2-3 | 1.0 | 0.19 | 0.5 | 30 | 13 | 60 | 2.3 |
| G2-4 | 1.0 | 0.39 | 0.7 | 48 | 13 | 69 | 3.7 |
| G2-5 | 1.0 | 0.39 | 0.7 | 48 | 20 | 69 | 2.4 |
| G2-6 | 1.0 | 0.79 | 1.0 | 30 | 20 | 30 | 1.5 |
| G2-7 | 1.0 | 0.39 | 0.7 | 30 | 20 | 43 | 1.5 |
| G2-8 | 1.0 | 0.19 | 0.5 | 30 | 20 | 60 | 1.5 |
| G2-9 | 1.0 | 0.19 | 0.5 | 24 | 20 | 48 | 1.2 |
| G2-10 | 1.0 | 0.19 | 0.5 | 18 | 20 | 36 | 0.9 |
| G2-11 | 1.0 | 0.79 | 1.0 | 30 | 13 | 30 | 2.3 |
| G2-12 | 1.0 | 0.39 | 0.7 | 30 | 13 | 43 | 2.3 |
| G2-13 | 1.0 | 0.19 | 0.5 | 30 | 13 | 60 | 2.3 |
| G2-14 | 1.0 | 0.19 | 0.5 | 18 | 13 | 36 | 1.4 |
| G2-15 | 1.0 | 0.19 | 0.5 | 24 | 13 | 48 | 1.8 |
| G3-1 | 0.5 | 0.79 | 1.0 | 30 | 13 | 30 | 2.3 |
|  | 0.5 | 0.39 | 0.7 | 30 |  | 43 |  |
| G3-2 | 0.5 | 0.79 | 1.0 | 30 | 13 | 30 | 2.3 |
|  | 0.5 | 0.19 | 0.5 | 30 |  | 60 |  |

TABLE 2

| Specimen No. | Bending Toughness Tb (kN · mm) | Converted bending strength Be (N/mm²) | Bending strength σb (N/mm²) |
|---|---|---|---|
| G1-1 | 16.7 | 2.40 | 5.93 |
| G1-2 | 19.3 | 2.81 | 6.44 |
| G1-3 | 19.3 | 2.81 | 5.94 |
| G1-4 | 18.0 | 2.67 | 6.40 |
| G1-5 | 14.0 | 2.04 | 6.65 |
| G1-6 | 22.0 | 3.24 | 6.34 |
| G1-7 | 16.1 | 2.39 | 5.82 |
| G2-1 | 35.6 | 5.21 | 7.27 |
| G2-2 | 31.1 | 4.59 | 6.85 |
| G2-3 | 41.2 | 6.06 | 7.16 |
| G2-4 | 35.5 | 5.27 | 7.22 |
| G2-5 | 28.2 | 4.16 | 6.62 |
| G2-6 | 24.8 | 3.64 | 7.58 |
| G2-7 | 23.2 | 3.38 | 7.13 |
| G2-8 | 30.8 | 4.59 | 7.08 |
| G2-9 | 28.3 | 4.19 | 7.58 |
| G2-10 | 18.6 | 2.76 | 7.39 |
| G2-11 | 25.8 | 3.71 | 5.86 |
| G2-12 | 34.1 | 4.92 | 6.26 |
| G2-13 | 34.7 | 5.06 | 6.50 |
| G2-14 | 28.3 | 4.16 | 5.87 |
| G2-15 | 31.8 | 4.62 | 7.08 |
| G3-1 | 39.2 | 5.78 | 7.01 |
| G3-2 | 37.6 | 5.49 | 6.92 |

The bending toughness test was conducted in accordance with the standards set forth in "Test method for bending strength and bending toughness of steel fiber reinforced concrete" of Japan Society of Civil Engineers (JSCE-G 552-1999). To be more specific, this is a test method of loading a prism specimen of 10×10×40 cm with a three-point load and measuring the deflection and loading load at the center point. Table 1 shows the combination of volume mixing ratios Vf and shape parameters of the short fiber corresponding to the specimen numbers in the bending toughness test. Table 2 also shows the bending toughness test results. Here, bending toughness refers to the area of the bending toughness curve in which the displacement of the center point of the specimen is up to 2 mm, and converted bending strength refers to the value converting this into bending strength. Also, bending strength refers to the value converting the value at the first peak of the bending strength curve into bending strength.

FIG. 6 shows the results of the bending toughness test of typical specimens by the relationship between the loading load and the displacement of the center point. Although the results of FIG. 6 show the test results of typical shape parameters for when the volume mixing ratio Vf of short fibers is 0.5% (group G1) and 1.0% (group G2 and G3), the overall common behavior can be explained as follows. Looking at the bending toughness curves, at the initial stage of the loading load, there is a behavior in which the bending stress increases linearly with respect to the deflection of the center point, and, following this, the bending stress drops sharply. The zone exhibiting this behavior will be referred to as the "first zone". Also, the initial peak will be referred to as the "first peak".

After that, the bending stress tends to increase again. The degree of that increase may be greater than the first peak in some cases, and not so in other cases. The increased bending stress tends to gradually decrease again, as the deflection at the center point increases. The zone exhibiting this behavior will be referred to as a "second zone". Also, the second peak will be referred to as the "second peak".

Note that, in plain concrete without short fiber reinforcement, the second zone does not exist, and bending failure occurs instantly following the first peak. Then, in the first zone, during behavior in which the deflection of the center point increases linearly following the increase of load in the initial stage, the specimen is not cracked, and this is considered to show elastic behavior. Also, although the bending stress decreases after the first peak, this is likely to be due to the occurrence of bending cracks at the lower end near the center of the specimen, resulting in a sharp decrease of bending resistance.

Although the reason bending resistance drops sharply after the first peak is that bending cracking occurs at the lower end of the specimen, after that, the bending resistance increases again. This is a behavior caused by the short fibers crack bridging to each other at the boundaries of the cracked surface bearing the tensile force. Also, as for the degree of decrease in bending stress after the first peak, the mutual adhesion between the short fibers and concrete is maintained, the amount of decrease tends to be smaller as the tensile rigidity of the short fibers is higher and the amount of short fibers (the number of short fibers) to be mixed in increases.

Also, in the second zone, the bending stress tends to increase again. The increase of the second peak may be larger in some cases and not so in other cases. The reason the bending stress increases like this is that the short fibers crack bridging to each other on the cracked surface bear the tensile force.

Then, as the deflection of the center point increases beyond the second peak, the bending stress tends to gradually decrease again. This behavior might be a phenomenon that occurs because the crack bridging short fibers are cut or the adhesion between the short fibers and concrete gradually weakens.

From the results of Table 2 and FIG. 6, it can be observed that the performance of bending toughness depends on the volume mixing ratio Vf of short fibers. It is generally known that the performance of bending toughness improves as the volume mixing ratio Vf of short fibers increases. From the results of Table 2, the average value of bending toughness when the volume mixing ratio Vf of short fibers was 0.5% was 17.9 kN·mm, and the average value when the volume mixing ratio Vf of short fibers was 1.0% was 31.9 kN·mm By contrast with this, it may be possible to say that the results of the bending toughness of specimen numbers G2-10 deviates from the average value. It is likely that this is influenced by the shape parameter Lf/Gm=0.9.

Meanwhile, the bending toughness and converted bending strength shown in Table 2 other than specimen numbers G2 to 10 show good toughness characteristics as short fiber-reinforced concrete, and all are numerical values that can be evaluated. Also, the bending strengths shown in Table 2 are determined from the load of the first peak. These bending strengths are larger than the bending strength of plain concrete of 5.0 N/mm², which indicates that they also contribute to the improvement of initial bending cracking strength of the present invention.

Example 2

Figure 7:
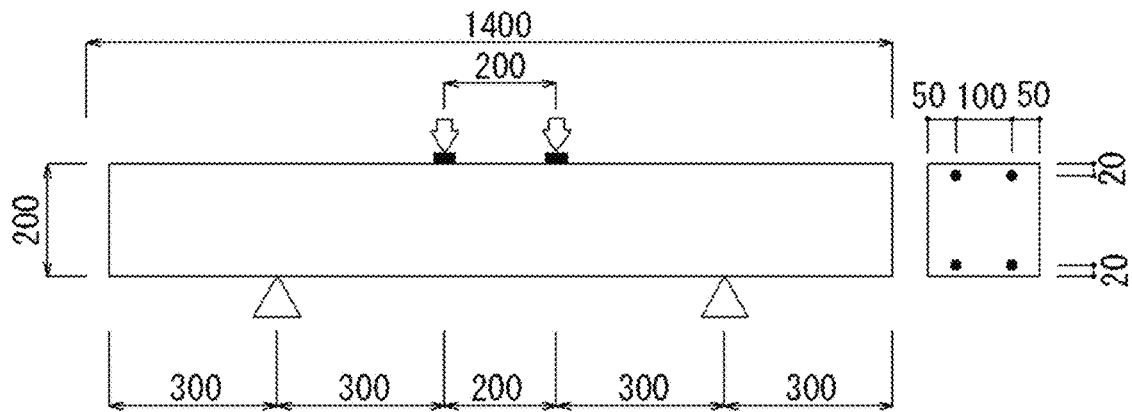
FIG. 7 is an experimental overview to show an overview of a structural experiment where a concrete of a short fiber-reinforcing material is used for a concrete slab of a continuous fiber-reinforced polymer material.

Example 2 is a structural experiment for demonstrating whether the structural performance as devised in the present invention can be exhibited when short fiber reinforcing material concrete is applied to a concrete slab of a continuous fiber-reinforced polymer material. FIG. 7 is an experimental schematic diagram to show an overview of a structural experiment when short fiber reinforcing material concrete is applied to a concrete slab of a continuous fiber-reinforced polymer material.

The specimen used in the structural experiment was, as shown in FIG. 7, a small beam having a cross section of 200×200 mm and a length of 1400 mm. For comparison, reinforcing bars SD290 D16 and D19 were used as the main tensile reinforcing material. By contrast with this, as for the continuous carbon fiber-reinforced polymer material, CFCC with a diameter of φ15.2 mm, which is a continuous carbon fiber-reinforced polymer material, and TF with a diameter of φ15.7 mm, which is a continuous aramid fiber-reinforced polymer material, were used, and the two were compared. As shown in FIG. 7, four of these main tensile reinforcing materials were arranged, securing a concrete cover of 20 mm. On the other hand, the concrete of the specimen was prepared by mixing plain concrete, in which no short fiber reinforcing material was mixed, with a short fiber reinforcing material, by changing the parameters of PP fibers (cross-sectional area $A_f=0.19$ mm² and 0.39 mm², equivalent diameter $De=0.5$ mm and 0.7 mm, length $Lf=30$ mm, and volume mixing rate $Vf=0.5\%$ and 1.0%).

Table 3 shows the material combinations of the small specimen beams. The composition of plain concrete used for these specimens, the slump and compressive strength before and after mixing in the short fiber reinforcing material are as follows.

Plain concrete: the water/binder ratio=W/B=37%, the sand/aggregate ratio=s/A=41% (without short fibers mixed) =50% (with short fibers mixed), the maximum aggregate diameter Gm=13 mm, the unit cement amount C=384 kgf/m³, the slump=16.5 cm (without short fibers mixed)=13 to 17.5 cm (with short fibers mixed), and the compressive strength=70 N/mm² (without short fibers mixed)=65 N/mm² (with short fibers mixed). Also, the slump after mixing the short fiber reinforcing material was 10 to 15.5 cm.

Note that, in this loading experiment, as shown in FIG. 7, the ratio between the side span length (=a) and the effective height (=d) is small (a/d=1.7). This ratio indicates a deep beam zone, where the shear capacity is greater than usual, and where failure in shear failure mode is little likely.

Figure 8:
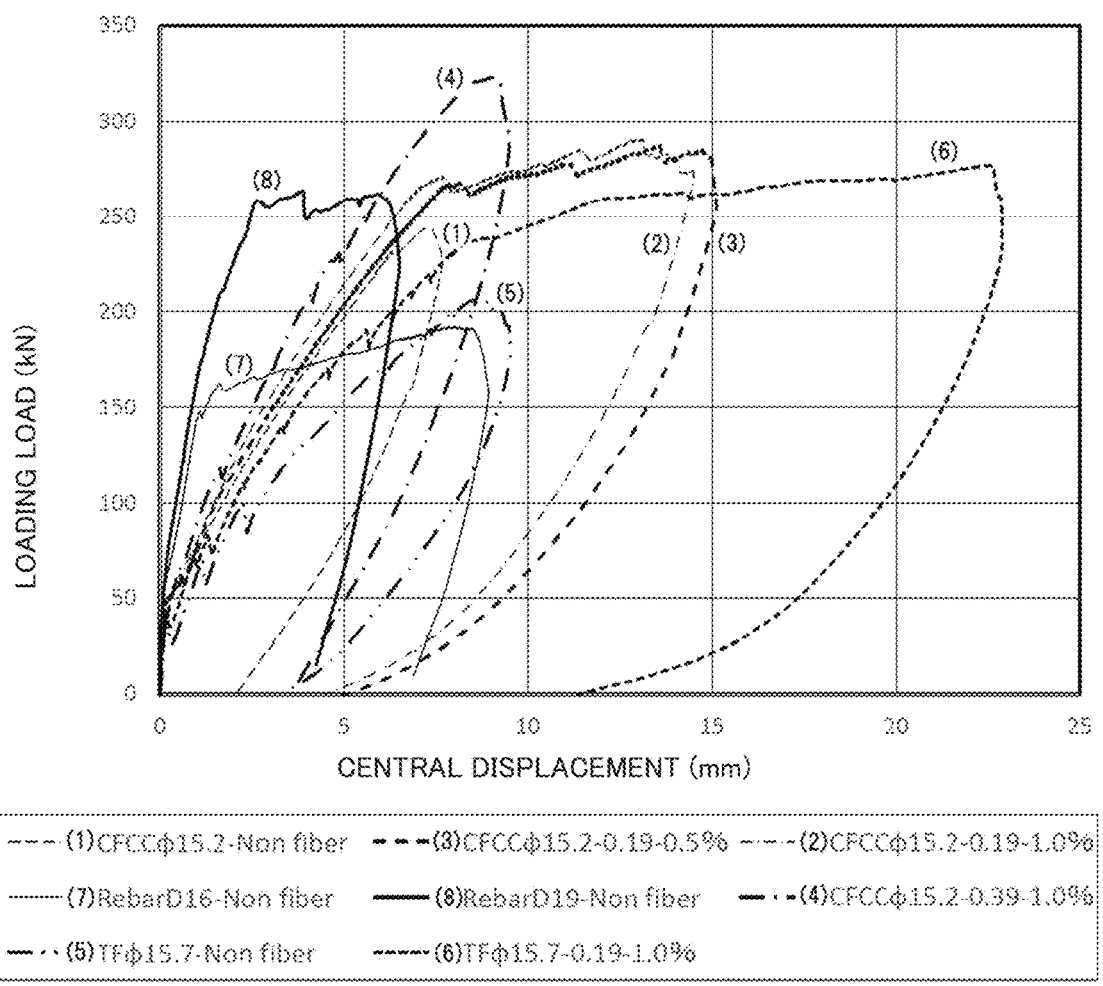
FIG. 8 is a graph to show the load-displacement curves in a loading experiment of small beam specimens.

FIG. 8 shows the load-displacement curves determined from the loading experiment of the small beam specimens prepared by combining comparative materials, as shown in Table 3. FIG. 8 is a graph to show the load-displacement curves in the loading experiment of small beam specimens. Here, the names of the specimens will be described. The specimens, to which reinforcing bars D16 and D19 were applied as the tensile reinforcing material, were reinforcing bar D16-non-fiber and reinforcing bar D19-non-fiber. CFCC φ15.2 and TF φ15.7 indicate cases in which a continuous carbon fiber-reinforced polymer material and a continuous aramid fiber-reinforced polymer material being used as the tensile reinforcing material, respectively. When no short fiber reinforcement was used, and when the volume mixing ratio Vf of short fiber reinforcement was zero, 0.5%, and 1.0%, non-fiber, 0.5%, and 1.0% were yielded, respectively. Furthermore, the cross-sectional area Af of the short fiber reinforcing material is shown as 0.19 and 0.39.

TABLE 3

| Name of Specimen | Reinforcing material | PP fiber mixed/not mixed PP fiber's shape and mixed volume | Lf/Gm | Lf/De | Initial bending cracking load kN | Maximum load kN | Maximum displacement mm |
|---|---|---|---|---|---|---|---|
| (1) CFCC φ15.2-Non-fiber | CFCC φ15.2 | PP fiber mixed | — | — | 35 | 243.9 | 7.7 |
| (2) CFCC φ15.2-0.19-1.0% | CFCC φ15.2 | Af = 0.19, De = 0.5, Lf = 30, Vf = 1.0% | 2.3 | 60 | 37 | 291.1 | 14.5 |
| (3) CFCC φ15.2-0.19-0.5% | CFCC φ15.2 | Af = 0.19, De = 0.5, Lf = 30, Vf = 0.5% | 2.3 | 60 | 40 | 287.6 | 15.1 |
| (4) CFCC φ15.2-0.39-1.0% | CFCC φ15.2 | Af = 0.39, De = 0.7, Lf = 30, Vf = 1.0% | 2.3 | 43 | 50 | 322.8 | 9.5 |
| (5) TF φ15.7-Non-fiber | TF φ15.7 | PP fiber not mixed | — | — | 35 | 206.1 | 9.5 |
| (6) TF φ15.7-0.19-1.0% | TF φ15.7 | Af = 0.19, De = 0.5, Lf = 30, Vf = 1.0% | 2.3 | 60 | 48 | 276.8 | 22.9 |
| (7) Rebar D16-Non-fiber | SD290 D16 | PP fiber not mixed | — | — | 30 | 192.0 | 8.0 |
| (8) Rebar D19-Non-fiber | SD290 D19 | PP fiber not mixed | — | — | 30 | 263.2 | 3.9 |

The load-displacement relationship of the specimens of deformed reinforcing bars of D19 and D16 shown in FIG. 8 (names: (8) reinforcing bar D19-non-fiber and (7) reinforcing bar D16-non-fiber) shows typical mechanical behaviors of RC beams. That is, after initial bending cracking occurs, moderate curves are shown, up to the yield point of the reinforcing bars, while maintaining the tensile rigidity of the reinforcing bars and developing bending cracks in the concrete in the tension zone along the tensile reinforcing bars. When the tensile reinforcing bars reach the yield point (the load of 165 kN for the D16 reinforcing bars, and the load of 260 kN for the D19 reinforcing bars), the load-displacement gradient becomes moderate to correspond to the tensile rigidity of the yield plateau of the reinforcing bars.

Meanwhile, in the case of the carbon fiber-reinforced (CFCC) and aramid fiber-reinforced (TF) specimens without short fibers mixed ((1) CFCC 15.2-non-fiber and (5) TF φ15.7-non-fiber), the load-displacement curve becomes moderate after initial bending cracking occurs. In the case of reinforcing bar reinforcement, carbon fiber reinforcement and aramid fiber reinforcement, the difference in this moderate gradient curve is the same as in the explanation described in the bending loading experiment of the concrete slab of FIG. 4, the gradient ratio among the reinforcing bar specimen, the carbon fiber specimen and the aramid fiber specimen is the ratio of tensile rigidity among the reinforcing bar, carbon fibers, and aramid fiber (elastic modulus of each material×cross-sectional area). When the tensile rigidities of the specimen numbers (8), (7), (1), and (5) are calculated, they are 60,300 kN, 41,800 kN, 35,800 kN, and 26,500 kN, respectively, and, when these are shown in ratio, (8):(7):(1):(5)=100:69:59:44 is given, which matches with the results of the gradient curve ratio in FIG. 8.

Also, since carbon fibers and aramid fibers have no yield point, there is no load-displacement change point that is equivalent to a yield plateau. The concrete on the compression side crushed at around the load of 244 kN with the continuous carbon fiber-reinforced polymer specimen ((1) CFCC φ15.2-non-fiber), and around the load of 205 kN with the continuous aramid fiber-reinforced polymer specimen ((5) TF φ15-non-fiber), and no load-holding behavior was exhibited after that.

Meanwhile, the specimens in which PP fibers were mixed in continuous carbon fiber-reinforced polymer specimen ((2) CFCC 15.2-0.19-1.0%, (3) CFCC φ15.2-0.19-0.5%, and (4) CFCC φ15.2-0.39-1.0%) and the specimen in which PP fibers were mixed in continuous aramid fiber-reinforced polymer specimen ((6) TF φ15.7419-1.0%) show moderate curves after bending cracking similar to those of PP fiber were not mixed in the continuous carbon fiber-reinforced polymer (CFCC) and continuous carbon aramid-reinforced polymer (TF) specimens ((1) CFCC φ15.2-non-fiber and (5) TF φ15.7-non-fiber). However, in the case of concrete mixed with PP fibers, both moderate curves are above those for the concrete not mixed with PP fibers, proving that the resistance on the bending tension side has increased by the crack bridging performance of PP fibers. The fact that the mixing of PP fibers contributes to the increase in resistance on the bending tension side shown above is also indicated by the differences in the maximum bending load (see Table 3). The maximum loads of continuous carbon-reinforced polymer reinforcement (CFCC) and continuous aramid-reinforced polymer reinforcement (TF) without PP fibers mixed were 244 kN and 206 kN, respectively, while the maximum load increased by average 23% in the event of continuous carbon-reinforced polymer reinforcement, and increased by average 34% in the event of continuous aramid-reinforced polymer reinforcement. This indicates that, although the carbon fibers or the aramid fibers mainly bear the tensile force caused by the bending cross-sectional force, the short fiber-reinforced concrete itself bears the tensile force, by means of the crack bridging performance of the PP fibers that are mixed into concrete.

Furthermore, in the case of continuous carbon-reinforced polymer r reinforcement, for the maximum displacement when PP fibers were not mixed ((1) CFCC φ15.2-non-fiber), the maximum displacement when PP fibers were mixed ((2) CFCC φ15.2-0.19-1.0% and (3) CFCC 15.2-0.19-0.5%) increased to 188% and 196%, respectively. (see Table 3) Also, in the case of continuous aramid-reinforced polymer r reinforcement, for the maximum displacement when PP fibers were mixed ((5) TF φ15.7-non-fiber), the maximum displacement when PP fibers were mixed ((6) TF φ15.7-0.19-1.0%) increased to 241%. (see Table 3) This indicates a deformation capacity of 1.8 to 5.9 times the maximum displacement of the reinforcing bar-reinforced specimens ((7) reinforcing bar D16-non-fiber and (8) reinforcing bar D19-non-fiber). (see Table 3) In other words, by mixing PP fibers into concrete beams, in which a continuous fiber-reinforced polymer material such as carbon fibers and aramid fibers is arranged, as a main reinforcing material, it was possible to give bending toughness greater than that of reinforced concrete beams.

Note that, the specimen ((4) CFCC φ15.2-0.39-1.0%) mixed with PP fibers was achieved in which the maximum load increased by 32%, but the increase in displacement was only up to 126% compared with the specimen ((1) CFCC φ15.2-non-fiber) without PP fibers. One reason for this is that, referring to the bending toughness test results (see FIG. 6), with specimen number G2-12 (beam specimen: (4) PP fiber used for CFCC φ15.2-0.39-1.0%), the load peaks at the displacement of approximately 0.75 mm, compared to G2-3 (beam specimens: (2) PP fiber used for CFCC φ15.2-0.19-1.0%, and (6) TF φ15.7-0.19-1.0%), and then the load decreases. On the other hand, since the load of specimen numbers G2-3 increases even after the displacement of 0.75 mm, it can be observed that the tension stiffening effect of PP fibers works in zones where the bending strain of the beam is large. However, for the beam specimen of the name (4) CFCC φ15.2-0.39-1.0%, the bending rigidity after initial bending cracking occurs is high, and the rate of increase of the maximum load is also high, so that the crack-bridging performance of PP fibers can be seen.

Example 3

The contents of Example 3 are as follows. Based on the basic knowledge of the structural performance of the structures, to which the materials (continuous fiber-reinforced polymer material+short fiber-reinforced concrete) achieved up to Example 2 are applied, a trial design was prepared according to the Specification for Highway Bridges, issued 2017 in Japan, under actual standard design conditions of road bridge concrete slabs. Then, specimens for a bending loading experiment were prepared based on the structure produced through the trial design, and the loading experiment was conducted to evaluate the structural performance as a concrete slab. The experimental specimens were prepared based on the result of the trial design, and their structural performance was compared and evaluated, in comparison with concrete slabs using steel, which is a conventional material.

The experimental specimens used in the bending loading experiment had length×width×thickness=2700×840×220 mm Post-tension-induced pre-stress (effective pre-stress=4.05 N/mm$^2$) was introduced in the longitudinal direction of the specimen (which, in actual bridges, corresponds to the direction of the bridge axis).

TABLE 4

| Name of specimen | Tendon | Distribution bars | Concrete | Lf/Gm | Lf/De | Concrete compression strength N/mm$^2$ | Joint mortar strength N/mm$^2$ | Maximum load kN | Maximum load displacement mm |
|---|---|---|---|---|---|---|---|---|---|
| Steel PC with joint | Steel PC φ17.8 | D13 @210 | No fiber | — | — | 57.2 | 66.5 | 341 | 31.4 |
| CFCC with joint | CFCC φ17.2 | None | PP fiber Af = 0.19, De = 0.5, Lf = 30, Vf = 0.5% | 1.5 | 60 | 73.4 | 66.5 | 389 | 36.5 |
| CFCC without joint | CFCC φ17.2 | None | PP Fiber Af = 0.19, De = 0.5, Lf = 30, Vf = 0.5% | 1.5 | 60 | 73.4 | — | 369 | 35.2 |

Table 4 shows three types of experimental specimens. The first one is a specimen, which uses a conventional PC steel stranded wire (φ17.8) as a tendon, in which no short fiber reinforcing material is mixed, and which uses conventional concrete (name: steel PC with joints). Here, "joints" refers to a structure for joining concrete slabs, which, being a post-tension structure in the direction of the bridge axis, provides a 30 mm-wide joints between joining parts, filling the gaps with a non-shrink mortar, and introducing pre-stress in the direction of the bridge axis after strength is developed, and integrating the concrete slabs.

The second specimen is a specimen (name: CFCC with joints), which uses CFCC (φ17.2) as a tendon, uses PP fiber-reinforced concrete for the concrete (PP fibers: cross-sectional area Af=0.19 mm$^2$, equivalent diameter De=0.5 mm, length Lf=30 mm, and volume mixing rate Vf=0.5%), and has connecting joints.

The third specimen (name: CFCC without joints) uses the same material as the above-described specimens, but this is a specimen to assume CFCC concrete slabs of an integral structure without connecting joints.

As shown in Table 4, the mix composition of plain concrete used for these specimens, the slump and compressive strength before and after mixing in the short fiber reinforcing material are as follows.

Plain concrete: the water/binder ratio=W/B=35%, the sand/aggregate ratio=s/A=41% (without short fibers mixed) =50% (with short fibers mixed), the maximum aggregate diameter Gm=20 mm, the unit cement amount C=471 kgf/m$^3$, the slump=16.5 cm (without short fibers mixed)=15 cm (with short fibers mixed), and the compressive strength=57.2 N/mm$^2$ (without short fibers mixed)=73.4 N/mm$^2$ (with short fibers mixed). Also, the slump after mixing the short fiber reinforcing material was 11 cm.

Figure 9A:
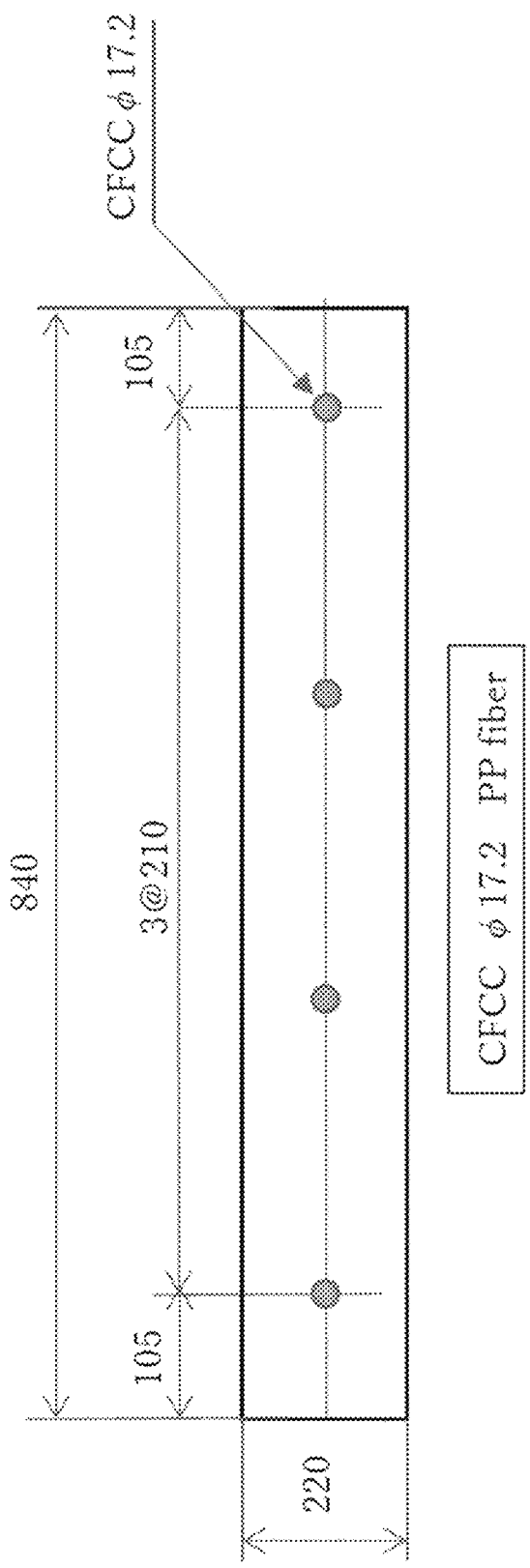
FIGS. 9A and 9B are cross-sectional views to show the experimental specimens used in a bending loading experiment.
Figure 9B:
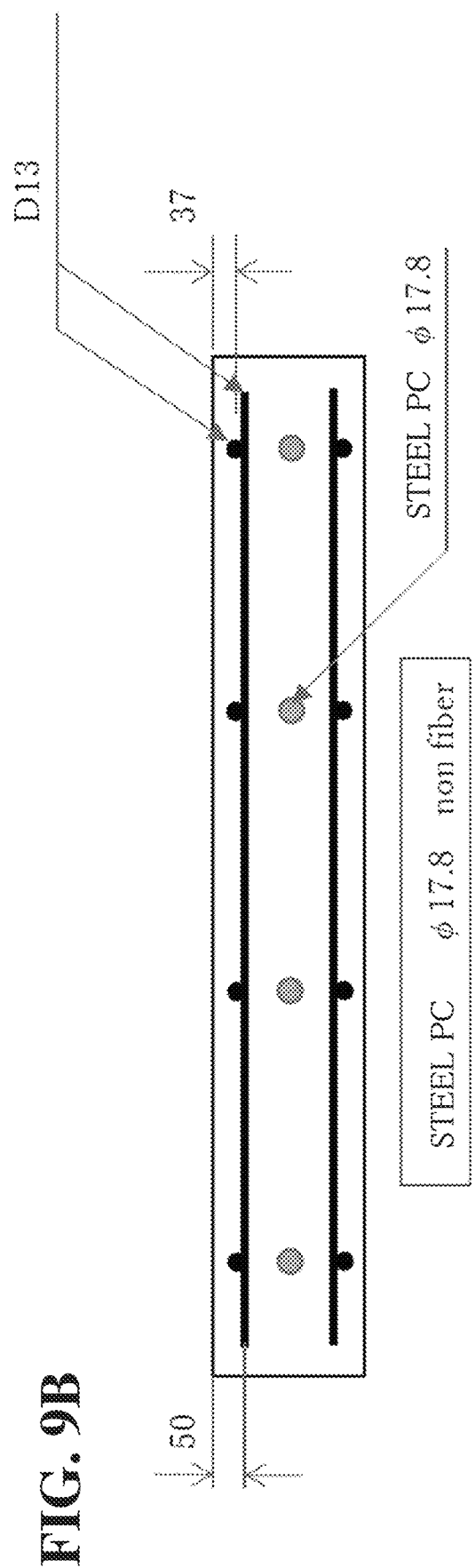

FIGS. 9A and 9B show cross-sectional views of the tendons (PC steel stranded wires and CFCC tendons) and the distribution bars. The point of interest in these cross-sectional views is that no distribution bars are arranged on the slab of the CFCC tendons. This is because the PP fibers mixed in the concrete play the role of distribution bars.

The spanning in the loading experiment is the same as in FIG. 3, and is a four-point bending load with side spans of 700 mm and a center span of 900 mm Note that, in this experiment, a fixed-point fatigue loading test was conducted with a design load before checking the failure state caused by static bending loading. The count of fatigues was 2 million times, and, after fixed-point fatigue loading, static bending loading was carried out, to determine the ultimate resistance bending moment.

Figure 10:
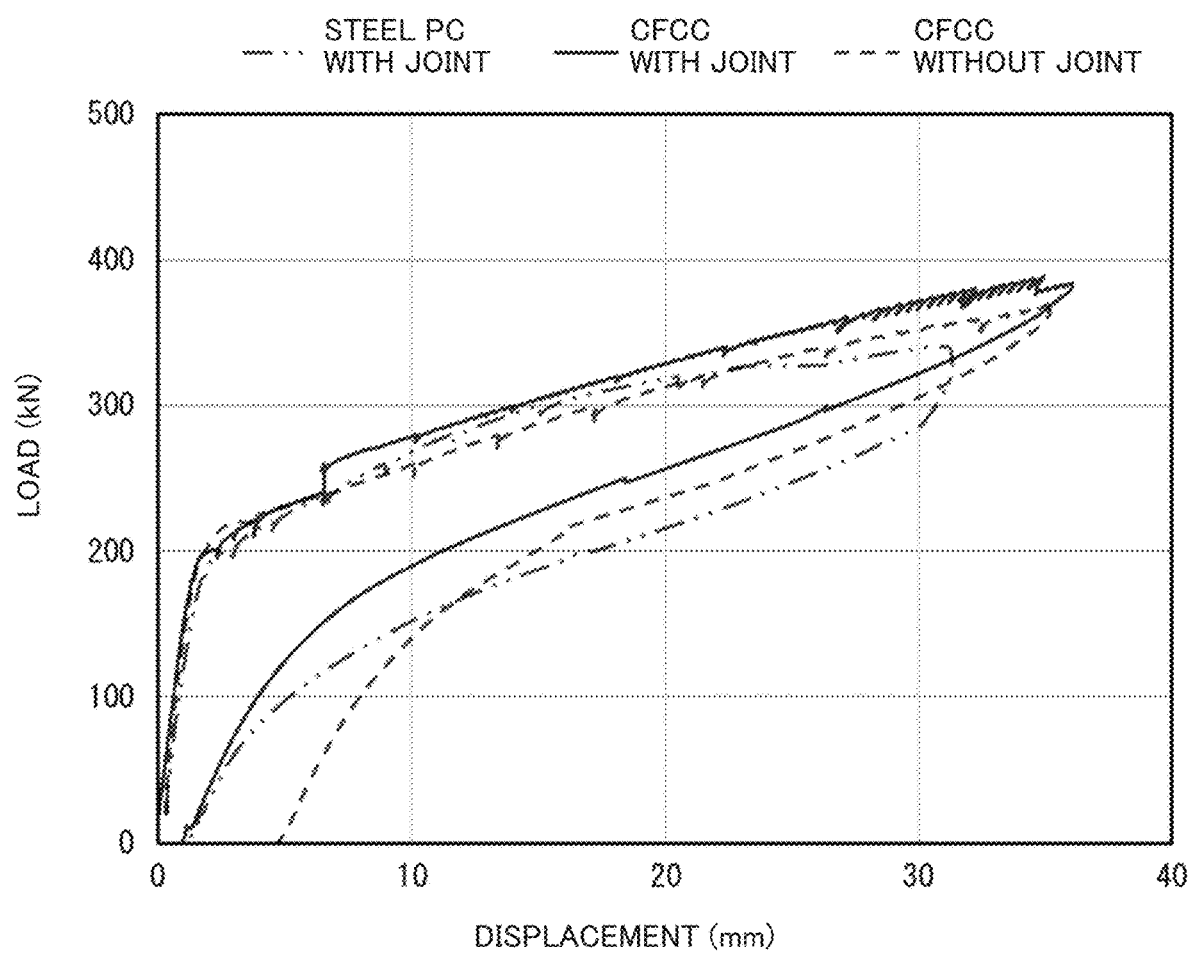
FIG. 10 is a graph to show the load-displacement curves in a static bending loading experiment after a fixed-point fatigue loading experiment.

In the fixed-point fatigue loading experiment, as a result of fatigue loading of 2 million times with a loading load P=55.9 kN determined from the design bending moment, no initial cracking due to bending was observed in any of the specimens. Also, the displacement of the center point did not change significantly. Shortly after the fixed-point fatigue loading experiment, a static bending loading experiment was conducted. FIG. 10 is a graph to show the load-displacement curves in the static bending loading experiment.

As shown in FIG. 10, the load-displacement curves of the three specimens may show unique structural performance as pre-stressed concrete structures. In other words, the three specimens share the same effective pre-stress in common, and, until the compressive stress due to the pre-stress becomes zero, and, furthermore, until the lower end of the slab assumes the initial bending cracking stress of concrete, the slab works valid in the entire cross-section, and its bending rigidity is linear with respect to the load. The limit load may be approximately 200 kN. Looking at FIG. 10 closely, the CFCC slab has slightly higher initial bending rigidity and slightly higher load at which initial cracking occurs, than the steel PC slab. This may be an effect of PP fiber-reinforced concrete.

When the load exceeds 200 kN, the bending rigidity of the three specimens decreases. The CFCC slab and the steel PC slab have approximately the same bending rigidity, and the load can be increased until the top concrete of the concrete slab collapses. Here, it is a noteworthy point that, in the behavior after initial cracking occurs, if this is not a pre-stressed structure, the bending rigidity of the CFCC+PP fiber-reinforced slab drop to approximately ¼ of that of the reinforcing bar reinforced slab, as shown in FIG. 8, but in FIG. 10, both show nearly equal bending rigidity. This may be because pre-stress is introduced, and because of the impact of the tension stiffening of the PP fiber-reinforced concrete.

A further noteworthy point in Example 3 is that the CFCC specimen has no distribution bars or crack distribution bars other than the main tensile reinforcing material CFCC. In conventional slabs that are tensioned with PC steel stranded wires, distribution bars are supposed to be arranged due to the Specification for Highway Bridges in Japan. However, in CFCC slabs make use of PP fiber concrete, and therefore CFCC-based main tendons suffice, and it is not necessary to install distribution bars. Furthermore, regarding bending, it was proved that the structural performance was equal to or higher than that of PC steel stranded wires.

Example 4

Example 4 has proven that the most important structural performance of a concrete road slab is that the slab should have sufficient fatigue durability against the running wheel load, which is described in the Specification for Highway Bridges in Japan. Presently, when a new material is employed for a road/bridge concrete slab, or a concrete slab adopting a new structural method is used on an actual site, it is required to clear the running wheel load fatigue test based on the rules set forth, to check the fatigue durability performance.

As a result of investigating the failure mode of concrete slabs in running wheel load fatigue tests heretofore and the actual failure mode of concrete road slabs, concrete punching shear failure mode is known as being dominant for fatigue failure. That is, it is likely that, in many cases, the performance is checked in advance, by checking the punching shear performance of the concrete slabs before carrying out the running wheel load fatigue test.

Example 4 shows that the concrete slab of the present invention, compared to conventional steel PC slabs, has equal or greater punching shear resistance performance.

Figure 11:
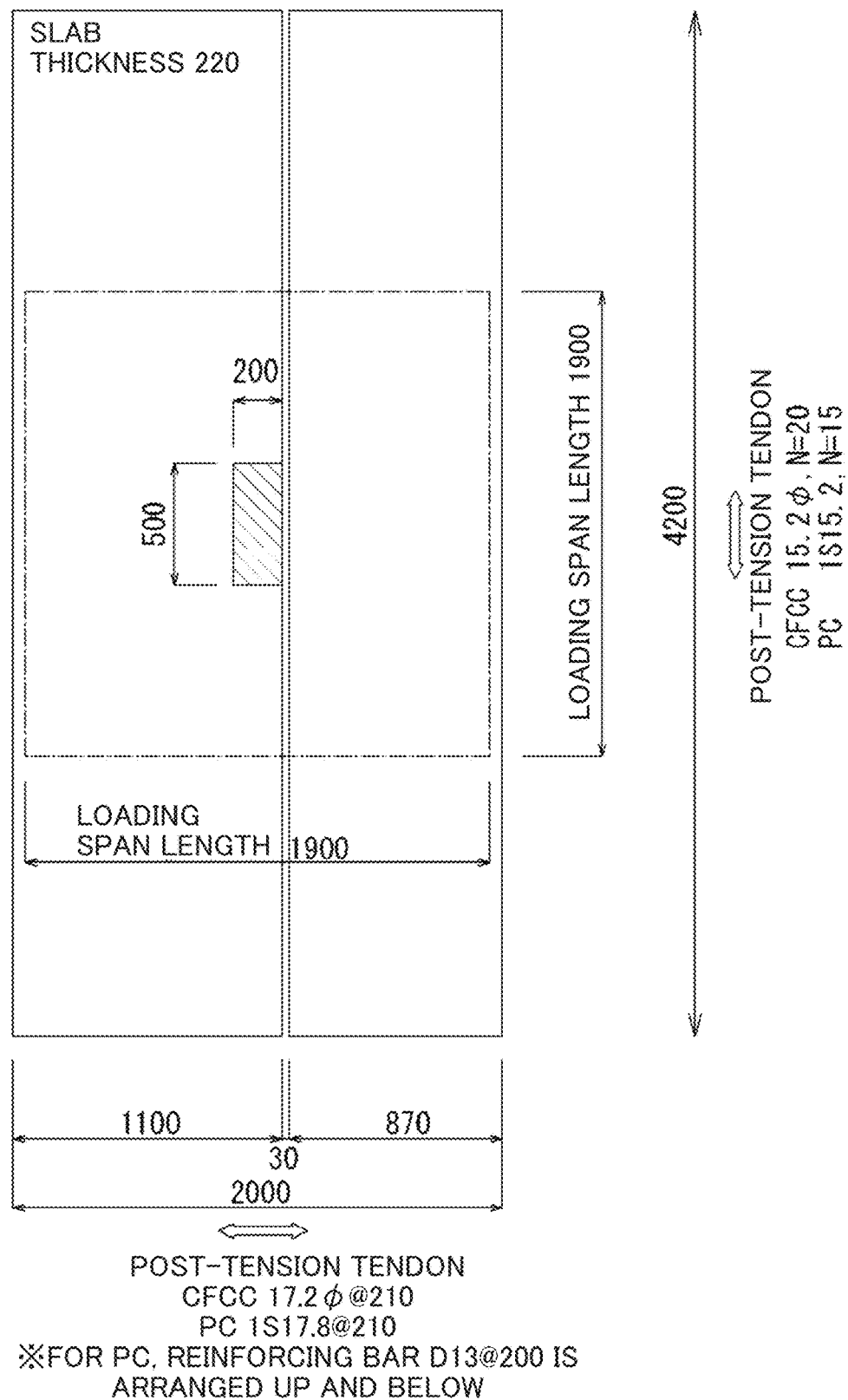
FIG. 11 is a plan view to show the specimen in a punching shear loading experiment.

FIG. 11 is a plan view to show a specimen of a punching shear loading experiment. As shown in FIG. 11, the shape and dimensions of the specimen were 2,000 mm in the bridge axis direction (post-tension direction) and 4,200 mm in perpendicular to the bridge axis direction (pre-tension direction), and the slab's thickness was 220 mm. Also, the punching shear load is not a point load, but is a rectangular distributing load having a width of 500 mm and a length of 200 mm, assuming the ground contact area of the track shown in FIG. 11. In the structural experiments up to Example 3, the structural performance could be evaluated in a two-dimensional experiment. However, the punching shear experiment is a three-dimensional experiment to reproduce the actual state of tension and the arrangement of distribution bars, not only in the thickness direction, but also in the direction of the bridge axis and the direction perpendicular to the bridge axis.

direction perpendicular to the bridge axis), in which no short fiber reinforcing material is mixed, and which uses conventional concrete (name: steel PC with joints). Also, for the distribution bars, reinforcing bars D13@200 are arranged above and below the bridge axis direction and the direction perpendicular to the bridge axis. Here, "joints" refers to a structure for joining concrete slabs, which, being a post-tension structure in the direction of the bridge axis, provides a 30 mm-wide joints between joining parts, filling the gaps with a non-shrink mortar, and introducing pre-stress in the direction of the bridge axis after strength is developed, and integrating the concrete slabs.

The second specimen is a specimen (name: CFCC with joints), which uses CFCC (with φ17.2@210 arranged in the direction of the bridge axis, and φ15.2, N=20 arranged in the direction perpendicular to the bridge axis) as a tendon, uses PP fiber-reinforced concrete for the concrete (PP fibers: cross-sectional area Af=0.19 $mm^2$, length Lf=30 mm, and volume mixing rate Vf=0.5%), and has connecting joints. Also, no force distribution bars are arranged in the CFCC concrete slab, and the role of force distribution bars is replaced by PP fiber-reinforced concrete.

The third specimen (name: CFCC without joints) uses the same material as the second specimen above, but this is a specimen assuming a concrete slab having an integral structure without connecting joints.

As shown in Table 5, the mix composition of plain concrete used for the specimens is as follows.

Plain concrete: the water/binder ratio=W/B=35%, the sand/aggregate ratio=s/A=41% (without short fibers mixed)=50% (with short fibers mixed), the maximum aggregate diameter Gm=20 mm, the unit cement amount C=471 $kgf/m^3$, the slump=16.5 cm (without short fibers mixed)=14 cm (with short fibers mixed), and the compressive strength=64.1 $N/mm^2$ (without short fibers mixed)=87.91\i/ $mm^2$ (with short fibers mixed).

Figure 12:
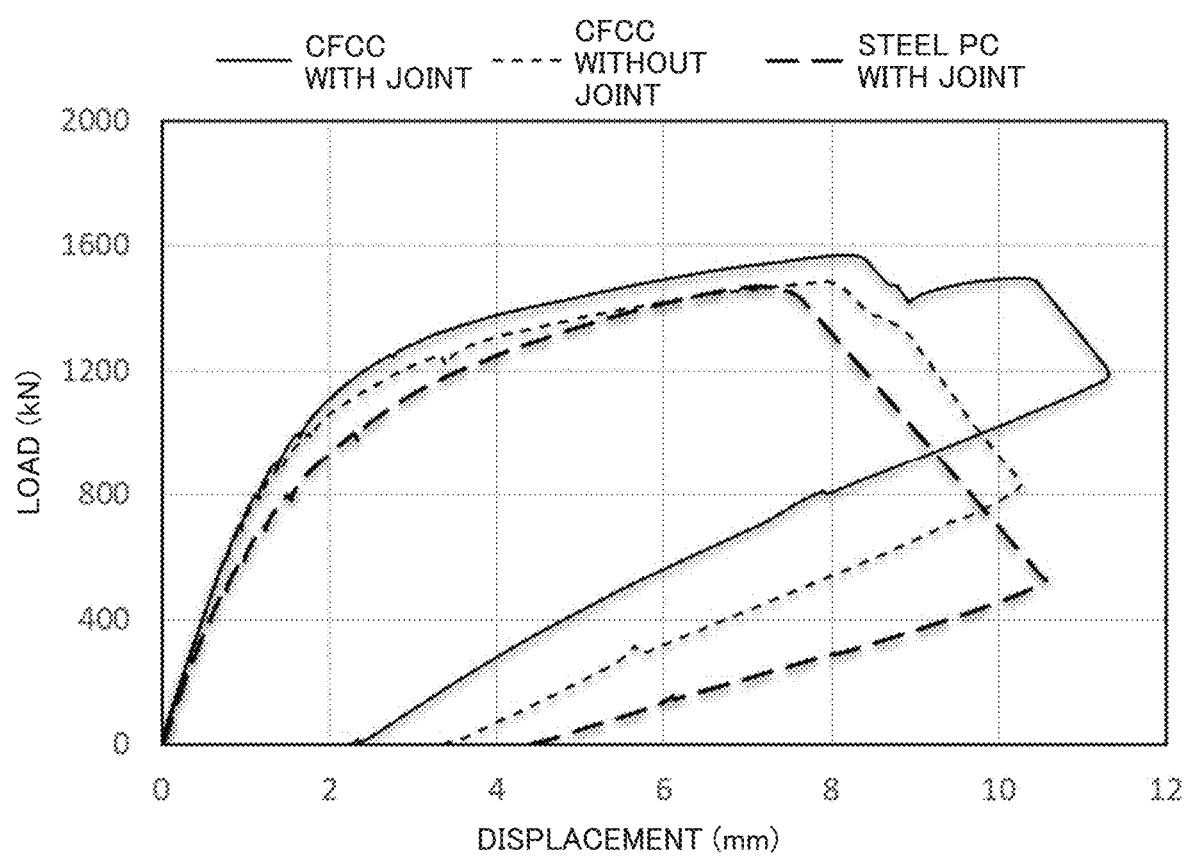
FIG. 12 is a graph to show the relationship between load and displacement in the punching shear experiment.

FIG. 12 is a graph to show the load-displacement relationship in the punching shear experiment. As is clear from FIG. 12, the concrete slab of the present invention has been

TABLE 5

| Name of specimen | Pre-tension Tendon material Bridge axis-perpendicular | Post-tension Tendon material Bridge axis | Reinforcing bar | Concrete | Lf/Gm | Lf/De | Concrete compression strength $N/mm^2$ | Maximum load k/N | Maximum load displacement mm |
|---|---|---|---|---|---|---|---|---|---|
| Steel PC with joint | Steel PC φ17.8 | PC steel 1S17.8 @210 | D13 @200 arranged up and below | No fiber | — | — | 64.1 | 1487 | 7.2 |
| CFCC with joint | CFCC φ15.2 N = 20 | CFCC φ17.2 @210 | None | PP fiber Af = 0.19, De = 0.5, Lf = 30, Vf = 0.5% | 1.5 | 60 | 86.9 | 1569 | 8.3 |
| CFCC without joint | CFCC φ15.2 N = 20 | CFCC φ17.2 @210 | None | PP fiber Af = 0.19, De = 0.5, Lf = 30, Vf = 0.5% | 1.5 | 60 | 88.9 | 1470 | 7.9 |

Table 5 shows three types of experimental specimens. The first one is a specimen, which uses a conventional PC steel stranded wire as a tendon (with φ17.8@210 arranged in the direction of the bridge axis, and φ15.2, N=18 arranged in the evaluated that using CFCC tendons and PP fiber-reinforced concrete, with no distribution bars arranged therein, was provided to have equal or better performance, compared to concrete slabs comprised of the combination of PC steel stranded wires and distribution bars designed based on conventional punching shear capacity formula.

Also, the maximum ultimate strength of the three specimens, designed based on the Specification for Highway Bridges in Japan, issued 2017, was proven to be approximately twice the characteristic value of the punching ultimate shear capacity calculated based on the Specification for Highway Bridges in Japan.

Now, based on what has been found out from the embodiments so far, the result of the punching shear experiment will be discussed. First, it is the shear capacity of concrete itself that significantly contributes to the punching shear resistance. The shear capacity of concrete is the displacement shear capacity of concrete and the tensile strength produced diagonally, but, in the design, shown as a function of the compressive strength of concrete. The next important factor is the dowel effect of the reinforcing material (PC steel stranded wires, distribution bars, CFCC tendons, etc.). Also, the compressive stress introduced into concrete due to pre-stress also resists the diagonal cracks in punching shear, and therefore is an important factor.

To summarize the experimental result of Example 4 based on these influencing factors, first, not much dowel effect can be expected from the CFCC tendons. This is because the shear rigidity and shear capacity of the continuous fiber-reinforced polymer material as reinforcing material are extremely small.

Considering these facts, the concrete according to the present invention, in which a continuous fiber-reinforced polymer material and an organic short fiber reinforcing material are mixed in concrete, may improve the shear resistance of the concrete itself by the crack bridging performance of the short fiber reinforcing material, so as to cover the zero dowel effect of the continuous fiber-reinforced polymer material. In other words, it is likely that the presence of the short fiber reinforcing material that effectively resists the diagonal cracks produced in concrete.

The pre-stressed concrete slab 1, the concrete slab 1', and embodiments 1 to 5, which concern concrete structures according to the first and second embodiments of the present invention, have been described in detail above. However, each embodiment described above or illustrated in the drawings simply shows one embodiment for carrying out the present invention, and the technical scope of the present invention should not be construed as being limited by these. In particular, although concrete slabs have been described as examples of concrete structures, the present invention is by no means limited to concrete slabs, and the present invention may be applied to other concrete structures as well.

REFERENCE SIGNS LIST

1: pre-stressed concrete slab (concrete structure)
1': concrete slab (concrete structure)
2: sheath
3: continuous fiber-reinforced polymer material twisted wire (continuous fiber-reinforced polymer material)
X: bridge axis direction
Y: direction perpendicular to bridge axis

The invention claimed is:

1. A concrete structure, in which a continuous fiber-reinforced polymer material is arranged as a main reinforcing material or a tendon,
wherein a short fiber reinforcing material consisting of an organic fiber is mixed in 0.5% or more and 2.5% or less, with respect to a concrete volume,
wherein the continuous fiber-reinforced polymer material is shaped as a rod or a stranded wire, and
wherein a ratio Lf/Gm between a fiber length Lf of the organic fiber of the short fiber reinforcing material and a maximum aggregate diameter Gm of a concrete composition is 1.2 or more and 3.7 or less, and an aspect ratio Lf/De is 30 or more and 69 or less, wherein De is an equivalent diameter which is a cross-sectional area of the organic fiber converted into a circle diameter.

2. A concrete structure, in which a continuous fiber reinforcing material is arranged as a main reinforcing material or a tendon,
wherein a short fiber reinforcing material consisting of an organic fiber is mixed in 0.5% or more and 2.5% or less, with respect to a concrete volume,
wherein the continuous fiber-reinforced polymer material is shaped as a rod or a stranded wire, and
wherein a ratio Lf/Gm between a fiber length Lf of the organic fiber of the short fiber reinforcing material and a maximum aggregate diameter Gm of a concrete composition is 1.2 or more and 3.7 or less, and a cross-sectional area of the organic fiber is 0.19 mm$^2$ to 0.79 mm$^2$.

3. A concrete slab, in which a continuous fiber-reinforced polymer material is arranged as a main reinforcing material or a tendon,
wherein a short fiber reinforcing material consisting of an organic fiber is mixed in 0.5% or more and 2.5% or less, with respect to a concrete volume,
wherein the continuous fiber-reinforced polymer material is shaped as a rod or a stranded wire, and
wherein a ratio Lf/Gm between a fiber length Lf of the organic fiber of the short fiber reinforcing material and a maximum aggregate diameter Gm of a concrete composition is 1.2 or more and 3.7 or less, and an aspect ratio Lf/De is 30 or more and 69 or less, wherein De is an equivalent diameter which is a cross-sectional area of the organic fiber converted into a circle diameter.

4. A concrete slab, in which a continuous fiber-reinforced polymer material is arranged as a main reinforcing material or a tendon,
wherein a short fiber reinforcing material consisting of an organic fiber is mixed in 0.5% or more and 2.5% or less, with respect to a concrete volume,
wherein the continuous fiber-reinforced polymer material is shaped as a rod or a stranded wire, and
wherein a ratio Lf/Gm between a fiber length Lf of the organic fiber of the short fiber reinforcing material and a maximum aggregate diameter Gm of a concrete composition is 1.2 or more and 3.7 or less, and a cross-sectional area of the organic fiber is 0.19 mm$^2$ to 0.79 mm$^2$.

5. The concrete slab according to claim 3, wherein the continuous fiber-reinforced polymer material comprises a carbon fiber or an aramid fiber.

6. The concrete slab according to claim 3, wherein the organic fiber of the short fiber reinforcing material comprises a polypropylene fiber.

7. The concrete slab according to claim 3, wherein pre-stress is introduced by the continuous fiber-reinforced polymer material.

8. The concrete slab according to claim 4, wherein the continuous fiber-reinforced polymer material comprises a carbon fiber or an aramid fiber.

9. The concrete slab according to claim 4, wherein the organic fiber of the short fiber reinforcing material comprises a polypropylene fiber.

10. The concrete slab according to claim 4, wherein pre-stress is introduced by the continuous fiber-reinforced polymer material.

\* \* \* \* \*